(12) United States Patent
Carstens et al.

(10) Patent No.: US 9,836,906 B2
(45) Date of Patent: Dec. 5, 2017

(54) TIME SYNCHRONIZATION

(71) Applicants: Christian Carstens, Windhagen (DE); Christoph Dautz, Bonn (DE); Jochen Jansen, Bonn (DE); Ramin Benz, Bonn (DE); Alexandra Dmitrienko, Darmstadt (DE); Stanislav Bulygin, Filderstadt (DE); Marcus Lippert, Pfungstadt (DE)

(72) Inventors: Christian Carstens, Windhagen (DE); Christoph Dautz, Bonn (DE); Jochen Jansen, Bonn (DE); Ramin Benz, Bonn (DE); Alexandra Dmitrienko, Darmstadt (DE); Stanislav Bulygin, Filderstadt (DE); Marcus Lippert, Pfungstadt (DE)

( * ) Notice: Subject to any disclaimer, the term of this patent is extended or adjusted under 35 U.S.C. 154(b) by 0 days.

(21) Appl. No.: 15/163,486

(22) Filed: May 24, 2016

(65) Prior Publication Data
US 2016/0269168 A1 Sep. 15, 2016

Related U.S. Application Data

(63) Continuation of application No. PCT/EP2014/076568, filed on Dec. 4, 2014.

(30) Foreign Application Priority Data

Dec. 5, 2013 (DE) .................... 10 2013 113 554
Apr. 11, 2014 (DE) .................... 10 2014 105 249

(51) Int. Cl.
G07C 9/00 (2006.01)
H04W 56/00 (2009.01)
(Continued)

(52) U.S. Cl.
CPC ....... *G07C 9/00896* (2013.01); *A47G 29/141* (2013.01); *A47G 29/16* (2013.01);
(Continued)

(58) Field of Classification Search
CPC .... G06F 1/24; G06F 1/04; G06F 1/12; H04W 12/08; H04W 4/008; H04W 56/001;
(Continued)

(56) References Cited

U.S. PATENT DOCUMENTS 5,737,421 A * 4/1998 Audebert ............. G06Q 20/341
285/382
5,887,065 A * 3/1999 Audebert ............. G06Q 20/341
235/382
(Continued)

FOREIGN PATENT DOCUMENTS

CN 101294463 A 10/2008
CN 102426715 A 4/2012
(Continued)

OTHER PUBLICATIONS

Elaine Barker et al., Special Publication 800-133 Recommendation for Cryptographic Key Generation, Dec. 2012, 26 pages, National Institute of Standards and Technology (NIST) U.S. Department of Commerce, Gaithersburg, MD.
(Continued)

*Primary Examiner* — Techane Gergiso
*Assistant Examiner* — Carlos M De Jesus Lassala
(74) *Attorney, Agent, or Firm* — Reinhart Boerner Van Deuren P.C.

(57) ABSTRACT

A method having the steps of obtaining temporal information communicated to a first device; carrying out one or more of the following tests: a test to determine whether the first device is in a state following an initial operation, a battery replacement or other power outage, or a reset, a test
(Continued)

to determine whether a deviation between temporal information of the clock and the communicated temporal information is less than or equal to a threshold which is specified, and a test to determine whether the communicated temporal information has the same date as the temporal information of the clock; and synchronizing the clock using the communicated temporal information if all of one or more defined conditions are satisfied, wherein one of the one or more conditions requires that at least one of the one or more tests carried out has a positive result.

22 Claims, 6 Drawing Sheets

(51) Int. Cl.

| | | |
|---|---|---|
| H04L 29/06 | (2006.01) | |
| G06F 1/12 | (2006.01) | |
| H04L 9/08 | (2006.01) | |
| G06F 1/24 | (2006.01) | |
| H04W 12/08 | (2009.01) | |
| A47G 29/14 | (2006.01) | |
| A47G 29/16 | (2006.01) | |
| G07F 17/12 | (2006.01) | |
| G06Q 10/08 | (2012.01) | |
| H04L 9/32 | (2006.01) | |
| H04L 9/00 | (2006.01) | |
| E05B 43/00 | (2006.01) | |
| E05B 65/00 | (2006.01) | |
| E05B 47/00 | (2006.01) | |
| E05B 65/52 | (2006.01) | |
| E05C 9/08 | (2006.01) | |
| E05C 9/18 | (2006.01) | |
| H04L 9/14 | (2006.01) | |
| H04L 9/30 | (2006.01) | |
| G06F 1/10 | (2006.01) | |
| G06F 21/31 | (2013.01) | |
| H04L 7/00 | (2006.01) | |
| H04W 4/00 | (2009.01) | |
| G06F 1/04 | (2006.01) | |
| H04L 9/06 | (2006.01) | |

(52) U.S. Cl.
CPC ........ *E05B 43/005* (2013.01); *E05B 47/0001* (2013.01); *E05B 65/0003* (2013.01); *E05B 65/0078* (2013.01); *E05B 65/5246* (2013.01); *E05C 9/08* (2013.01); *E05C 9/18* (2013.01); *G06F 1/10* (2013.01); *G06F 1/12* (2013.01); *G06F 1/24* (2013.01); *G06F 21/31* (2013.01); *G06Q 10/083* (2013.01); *G06Q 10/0836* (2013.01); *G07C 9/00* (2013.01); *G07C 9/00111* (2013.01); *G07C 9/00119* (2013.01); *G07C 9/00182* (2013.01); *G07C 9/00309* (2013.01); *G07C 9/00817* (2013.01); *G07C 9/00904* (2013.01); *G07C 9/00912* (2013.01); *G07F 17/12* (2013.01); *H04L 7/0012* (2013.01); *H04L 9/00* (2013.01); *H04L 9/08* (2013.01); *H04L 9/0819* (2013.01); *H04L 9/14* (2013.01); *H04L 9/302* (2013.01); *H04L 9/3242* (2013.01); *H04L 9/3247* (2013.01); *H04L 9/3249* (2013.01); *H04L 63/045* (2013.01); *H04L 63/062* (2013.01); *H04L 63/10* (2013.01); *H04W 4/008* (2013.01); *H04W 12/08* (2013.01); *H04W 56/001* (2013.01); *A47G 2029/149* (2013.01); *G06F 1/04* (2013.01); *G07C 2009/0092* (2013.01); *G07C 2009/00373* (2013.01); *G07C 2009/00412* (2013.01); *G07C 2009/00468* (2013.01); *G07C 2009/00642* (2013.01); *G07C 2209/08* (2013.01); *G07C 2209/63* (2013.01); *G07C 2209/64* (2013.01); *H04L 9/0637* (2013.01); *H04L 9/088* (2013.01); *H04L 2209/805* (2013.01)

(58) Field of Classification Search
CPC ......... H04L 7/0012; H04L 63/10; H04L 9/08; H04L 9/14; H04L 9/302; H04L 63/045; H04L 9/0819; H04L 63/062; H04L 9/00; H04L 9/3242; H04L 9/3247; H04L 9/3249; G07C 9/00896; A47G 29/141; E05B 43/005

See application file for complete search history.

(56) References Cited

U.S. PATENT DOCUMENTS

| | | | | |
|---|---|---|---|---|
| 2007/0252675 | A1* | 11/2007 | Lamar | ................ B25F 5/00 340/5.64 |
| 2014/0211780 | A1* | 7/2014 | Kang | ............... H04J 3/0667 370/350 |
| 2014/0226553 | A1* | 8/2014 | Ko | .................. H04J 3/0635 370/312 |

FOREIGN PATENT DOCUMENTS

| | | | |
|---|---|---|---|
| CN | 103116928 A | | 5/2013 |
| CN | 103390302 A | | 11/2013 |
| DE | 102 02 802 A1 | | 9/2003 |
| DE | 20 2011 101 134 U1 | | 9/2011 |
| DE | 20 2012 012 010 U1 | | 3/2013 |
| EP | 0 698 706 A1 | | 2/1996 |
| EP | 0698706 | * | 2/1996 |
| EP | 1 277 632 A2 | | 1/2003 |
| EP | 1758308 | * | 2/2007 |
| EP | 2 595 341 A1 | | 5/2013 |

OTHER PUBLICATIONS

JH. Song et al., Request for Comments (RFC) Document 4493, The AES-CMAC Algorithm, Jun. 2006, 20 pages, Network Working Group, The Internet Society, WA.

H. Krawczyk et al., Request for Comments (RFC) Document 2104, HMAC: Keyed-Hashing for Message Authentication, Feb. 1997, 11 pages, Network Working Group, NY.

* cited by examiner

TIME SYNCHRONIZATION

CROSS-REFERENCE TO RELATED PATENT APPLICATIONS

This patent application is a continuation of PCT/EP2014/076568, filed Dec. 4, 2014, which claims priority to German Application No. 10 2013 113 554.4, filed Dec. 5, 2013, and German Application No. 10 2014 105 249.8, filed Apr. 11, 2014, the entire teachings and disclosure of which are incorporated herein by reference thereto.

FIELD

Exemplary embodiments of the invention relate to a method for synchronizing a clock of a first apparatus, a method for communicating temporal information from a second apparatus to the first apparatus, and corresponding apparatuses, computer programs and a system comprising these apparatuses. Exemplary embodiments of the invention relate particularly to the synchronization of a clock of an access control apparatus by temporal information communicated by a portable electronic apparatus.

BACKGROUND

Access control apparatuses are used in various respects, for example to control the access of persons to rooms in a building, as is the case in hotels, office complexes or laboratories, for example, to events or even, in an abstract form, for functions, resources or services, for example of computer functions or computer resources or server services.

One specific application of access control apparatuses is also formed by control of the access of persons to openings of containers, such as e.g. safety deposit boxes or goods delivery containers, particularly of parcel boxes. Parcel boxes allow a novel form of delivery/pickup of parcels for persons who wish to receive or send parcels at or in proximity to their residence even in their absence. To this end, parcel boxes are usually installed in front of the residence of the parcel box user—in a similar manner to a mail box, but with a greater receiving volume—and parcels are then delivered by the delivery agent by placing them into the parcel box or are picked up by removing them from the parcel box. In order to prevent misuse and theft, the parcel box needs to have a lock. Both the delivery agent and the parcel box user then need to be equipped with physical or electronic keys in order to be able to use the parcel box. The electronic keys may be stored as data records, for example, on what are known as tokens, for example on mobile telephones or RFID tags.

SUMMARY OF SOME EXEMPLARY EMBODIMENTS OF THE INVENTION

It is fundamentally desirable for the use of electronic keys to involve the validity period of these keys being able to be limited so that the electronic keys can continue to be used properly after the agreed or acknowledged use time has elapsed. For this purpose, electronic keys can comprise one or more access authorization parameters, for example, that define the period during which keys can be used to operate a lock. For the check performed as part of the access authorization check in order to determine whether this period has not yet elapsed, the lock requires a clock. However, particularly clocks of battery-operated locks have not insignificant target time deviations, for example in the order of magnitude of a few minutes per month, so that ensuring the synchronism of the clock of a lock and the clock of an apparatus that generates the access authorization parameters that define the period of use of the key requires the provision of options for synchronizing the clock of the lock.

The inventors have, furthermore, recognized that, within the context of the synchronization of clocks of access control apparatuses, there are not insignificant manipulation opportunities that could be utilized by an attacker in order to gain unauthorized access. In particular, an attempt could be made to reactivate a key that has already elapsed in respect of time again by synchronizing the clock of the lock to a (false) time that is in the use interval for the key that has already elapsed.

Therefore, the present invention addresses the object of overcoming these problems and providing a safe way of synchronizing clocks with target time deviations.

According to a first aspect of the invention, a method, performed by a first apparatus, is disclosed that comprises the following:

obtaining temporal information communicated to the first apparatus, and performing one or more of the following checks:
 a check to determine whether the first apparatus is in a state after initial startup, after a battery change or after a reset,
 a check to determine whether a deviation between temporal information from the clock and the communicated temporal information is less than or less-than-or-equal-to a threshold value that is predefined or determined according to a predefined rule,
 a check to determine whether the communicated temporal information has the same date as the temporal information from the clock,
synchronizing the clock using the communicated temporal information if all of one or more predefined conditions are satisfied, wherein one of the one or more conditions requires that at least one of the one or more performed check(s) has yielded a positive result.

According to the first aspect of the invention, the use of a second apparatus for communicating the temporal information to the first apparatus according to the first aspect of the invention is additionally disclosed.

According to a second aspect of the invention, a method, performed by a second apparatus, is disclosed that comprises the following:

communication of temporal information, which is obtained using a clock of the second apparatus, to a first apparatus, in order to enable the first apparatus to perform one or more of the following checks:
 a check to determine whether the first apparatus is in a state after initial startup, after a battery change or after a reset,
 a check to determine whether a deviation between temporal information from the clock of the first apparatus and the communicated temporal information is less than or less-than-or-equal-to a threshold value that is predefined or determined according to a predefined rule,
 a check to determine whether the communicated temporal information has the same date as the temporal information from the clock of the first apparatus,
 wherein the first apparatus synchronizes its clock using the communicated temporal information if all of one or more predefined conditions are satisfied, one of the one or more conditions requires that at least one of the one or more performed check(s) has yielded a positive result.

According to each of these aspects of the invention, each of the following are moreover disclosed:

A computer program, comprising program instructions that cause a processor to perform and/or control the method according to the respective aspect of the invention when the computer program runs on the processor. In this specification, a processor is intended to be understood to mean, inter alia, control units, microprocessors, microcontrol units, such as microcontrollers, Digital Signal Processors (DSP), Application-Specific Integrated Circuits (ASICs) or Field Programmable Gate Arrays (FPGAs). In this context, it is either possible for all steps of the method to be controlled, or all steps of the method to be performed, or for one or more steps to be controlled and one or more steps to be performed. By way of example, the computer program may be distributable via a network such as the Internet, a telephone or mobile radio network and/or a local area network. The computer program may at least in part be software and/or firmware of a processor. It may equally at least in part be implemented as hardware. By way of example, the computer program may be stored on a computer-readable storage medium, e.g. a magnetic, electrical, electromagnetic, optical and/or other kind of storage medium. By way of example, the storage medium may be part of the processor, for example a (nonvolatile or volatile) program memory of the processor or a part thereof.

An apparatus, configured to perform and/or control the method according to the respective aspect of the invention or comprising respective means for performing the steps of the method according to the respective aspect of the invention. In this context, either all steps of the method can be controlled, or all steps of the method can be performed, or one or more steps are controlled and one or more steps are performed. One or more of the means can also be performed and/or controlled by the same unit. By way of example, one or more of the means may be formed by one or more processors.

An apparatus that comprises at least one processor and at least one memory that contains program code, wherein the memory and the program code are configured to cause the apparatus having the at least one processor to perform and/or control at least the method according to the respective aspect of the invention. In this context, either all steps of the method can be controlled, or all steps of the method can be performed, or one or more steps are controlled and one or more steps are performed.

According to a third aspect of the invention, a system is disclosed that comprises the following:
a first apparatus according to the first aspect of the invention, and
a second apparatus according to the second aspect of the invention.

By way of example, the first, second and third aspects of the invention are used in a system for delivering and/or picking up shipments.

These three aspects of the present invention have, inter alia, the—in some cases exemplary—properties described below.

By way of example, this first apparatus may be an access control apparatus or a part thereof. An access control apparatus is used to perform access control, for example access to rooms in buildings (e.g. hotels, office complexes, laboratories) or apparatuses, to events (e.g. concerts, sports events), to functions (for example of a computer, e.g. via a login), to resources or to services (for example to a service provided by a server, e.g. online banking, social networks, email accounts) is controlled. Examples of access to spaces in apparatuses are access to holding spaces of holding apparatuses, such as e.g. safety deposit boxes, lockers, refrigerators, goods delivery containers, mail boxes, parcel boxes or combined mail and parcel boxes, each of which are closed by doors and secured by locking devices, for example.

By way of example, the access control apparatus may be one or more processors that can control one or more locking devices, for example an electronically actuatable lock, and hence cause opening and/or closing of the lock, for example. The lock may be equipped with a catch function, for example, so that the access control apparatus need only control opening of the lock (for example by at least intermittently transferring the catch to an open position, for example by means of an electric motor), while the lock is closed manually by a user by virtue of the latter using the catch function and, for example by pushing a door to, driving the catch from the closed position to the open position and, after pushing-to has ended, the catch automatically returning to the closed position again, for example by virtue of spring loading.

The access control apparatus can also comprise the closing devices and further components. The access control apparatus may be part of an apparatus to which it controls the access, for example a holding apparatus. By way of example, the access control apparatus may be battery-operated and have no, in particular constant, electrical connection, for example.

By way of example, the first apparatus may be configured such that during operation it is configured exclusively for communication with second apparatuses (e.g. access authorization verification apparatuses) (particularly for obtaining the temporal information), and is not configured for communication with a third apparatus (e.g. an access authorization generation apparatus), for example. By way of example, the first apparatus has no connection to a mobile radio network, a Local Area Network (LAN), a Wireless Local Area Network (WLAN) or the Internet, and it is thus an "offline" apparatus, for example. By way of example, the wireless communication of the first apparatus may be configured for communication with apparatuses in the closer surroundings of the first apparatus (for example below 100 m). By way of example, the wireless communication of the first apparatus may be limited to communication by means of Radio Frequency Identification (RFID) and/or Near Field Communication (NFC) and/or Bluetooth (e.g. Bluetooth version 2.1 and/or 4.0). RFID and NFC are specified on the basis of ISO standards 18000, 11784/11785 and ISO/IEC standard 14443-A and 15693, for example. The Bluetooth specifications are available at www[dot]Bluetooth[dot]org. The first apparatus may nonetheless have a Universal Serial Bus (USB) interface, for example, which can be used to service the first apparatus, for example.

The first apparatus is used to obtain communicated temporal information. The temporal information is communicated (e.g. sent or transmitted, e.g. by means of wireless transmission, particularly by means of Bluetooth) particularly from a second apparatus to the first apparatus. By way of example, the temporal information may be a present date indicated by a clock of the second apparatus, and the present time of day, or a value that is representative thereof, for example a counter running since a predefined date, such as Unix time, for example, which indicates the number of seconds since 00:00 hours UTC on Jan. 1, 1970. The temporal information can have a granularity of seconds, minutes, hours or merely days, for example. In this way, the clock of the first apparatus can be synchronized in a simple manner and therefore does not have to have a particularly high accuracy or be in the form of a radio clock. However, the clock of the second apparatus may be in the form of a radio clock, for example. Alternatively, the clock of the second apparatus can be synchronized by a further apparatus, for example, e.g. by means of information transmitted to the second apparatus wirelessly or by wire. The further apparatus may then have a radio clock, for example. The temporal information can be communicated to the first apparatus together with access authorization information, for example, as will be explained in more detail below, for example at least in the same communication session.

Synchronization of the clock of the first apparatus can be performed using the (obtained) communicated temporal information, for example by accepting the communicated temporal information as new temporal information for the clock of the first apparatus. However, synchronization is tied to conditions in order to prevent improper synchronization to a false time. Therefore, the invention demands that the synchronization of the clock of the first apparatus be performed (in particular only) if all conditions from one or more predefined conditions are satisfied. By way of example, there may thus be only one condition predefined, or multiple, but in both cases all of the predefined conditions must then be satisfied in each case. One of the one or more predefined conditions (a further condition is discussed later on) requires that one check from one or more performed checks has yielded a positive result (that is to say that the question connected to the check must be answered in the affirmative). It is possible for just one check to be performed, or multiple checks can be performed. Regardless of how many checks are performed, however, at least one of these checks must have a positive result so that the one of the one or more conditions is satisfied.

The one or more check(s) include(s) particularly the following checks, which are consecutively numbered to simplify the discussion, this not being intended to indicate a preferred or, for example, prescribed order for the check, however:
  a first check to determine whether the first apparatus is in a state after initial startup, after a battery change or other power failure or after a reset,
  a second check to determine whether a deviation between temporal information from the clock and the communicated temporal information is less than or less-than-or-equal-to a threshold value that is predefined or determined according to a predefined rule,
  a third check to determine whether the communicated temporal information has the same date as the temporal information from the clock.

In this case, the notation "less-than-or-equal-to" denotes the known relation "≤".

By way of example, the second and third checks are alternatives to one another that are used, for example during operation of the first apparatus (that is to say, by way of example, not immediately after a first startup, a battery change (or other power failure) or a reset, but rather, by way of example, after one of these events and at least one synchronization following this event has taken place), in order to prevent the clock of the first apparatus from being adjusted, by the synchronization, to a potentially improper extent that is greater than the target time deviation that can be expected for the clock. By contrast, the first check is tailored to situations in which greater deviations between the clock of the first apparatus and the communicated temporal information necessarily arise, for example after a first startup, a battery change (or other power failure) or a reset. If, for such events, the clock of the first apparatus is set to a standard time, for example, or to the (stored) time of the last synchronization and then begins to run from this standard time or time, there is a high probability of the communicated temporal information differing greatly from the temporal information from the clock of the first apparatus on a subsequent synchronization attempt. In order nevertheless to allow (initial) synchronization in these special cases, it is therefore permitted for synchronization to take place. Optionally, however, it is possible to impose the further condition here that the synchronization can adjust the temporal information from the clock of the first apparatus only in the direction of the future, rather than in the direction of the past, as will be explained later on. This takes account of the assumption that the standard time or the time of the last synchronization will usually be in the past as compared with the time at which the event occurs.

For the first check, it is possible to use, by way of example, information relating to synchronization that has already taken place in order to decide whether the first apparatus is in a state after initial startup, after a battery change or other power failure or after a reset. By way of example, such information may not yet be stored in the first apparatus on an initial startup and/or can be erased, even if it was present, in the first apparatus after events such as a battery change or other power failure or a reset This may merely be a set bit (or register) that indicates that at least one synchronization has already taken place, or may be a more detailed piece of information that, by way of example, counts the number of synchronizations that have already taken place and/or stores information pertaining to the respective synchronization (e.g. with a time stamp). As a result of the check to determine whether such information is stored in the first apparatus, it is then thus possible to decide whether the first apparatus is in one of the cited states.

The second check can involve determination of the deviation, for example as an absolute value of the difference between the two pieces of temporal information. The predefined threshold value may be, by way of example, a threshold value that is stipulated once and then always used. By way of example, the threshold value can be stipulated by taking account of the average target time deviation in the clock of the first apparatus (which e.g. is known from a data sheet for the clock) and the estimated frequency of synchronizations. If the average target time deviation in the clock of the first apparatus is 6 minutes per month, for example, and a synchronization is expected at least every two months, then the threshold value 12 min. (if need be with an additional safety margin of a few minutes), for example, can be chosen in order to ensure reliable operation without substantial opportunities for malicious manipulation. Examples of predefined threshold values are 5, 10, 15, 20 or 30 minutes or 1, 2 or 5 hours. By way of example, the threshold value defines a synchronization interval around the temporal information from the clock, with a synchronization (in accordance with the first check) taking place only if the communicated temporal information of the second apparatus is within this synchronization interval. This can particularly prevent an attempt from being made to adjust the clock of the access control apparatus with fraudulent intent to another date, particularly one in the past, so as then to be able to gain access to the access control apparatus, for example using access authorization information that is available for this other date. Alternatively, the threshold value can be determined (for example dynamically) according to a predefined rule (for example by the first apparatus, for example on every first check) and, in the process, can take account not only of the average target time deviation but also of the time that has elapsed since the last synchronization, for example in order to also cover cases in which the synchronization takes place less frequently than expected.

As already mentioned, the third check may be provided as an alternative to the second check, for example (that is to say that only either the second check or the third check can be performed in the first apparatus, but not the two together). The third check is a check that is computationally simple (particularly in comparison with the second check) and that ensures that the date of the clock of the first apparatus cannot be advanced. This may be an appropriate measure if access authorizations that are to be checked by the first apparatus have a temporal validity of in each case one day, for example. So long as the communicated temporal information does not cause a change of date, that is to say adjusts the time only within one day, it can thus be permitted for synchronization.

These checks thus ensure that synchronization takes place only to an extent that is required for ensuring the functionality of the first apparatus, but at the same time offers little leeway for malicious manipulations of the temporal information from the clock of the first apparatus.

Instead of synchronizing the clock using the communicated temporal information, it is also possible for the clock to be set to a time that is obtained from the temporal information from the clock plus or minus a threshold value (for example a threshold value that is predefined or determined according to a predefined rule), as explained more precisely below. In this case, none of the checks has to achieve a positive result, for example.

As already mentioned, however, the first aspect of the invention is intended to be understood to mean that just the first check, just the second check or just the third check is performed, in common with scenarios in which multiple instances or all of the first to third checks are performed, e.g. the first and second checks, or the first and third checks. Accordingly, the intention is also for such methods, apparatuses, computer programs and systems from all three aspects of the invention as include, in a list of checks to be performed, only the first, only the second or only the third check, and also all possible combinations of two or three of these checks, to be understood as disclosed, for example that is to say including the following methods and the corresponding apparatuses, computer programs and systems thereof:

A method, performed by a first apparatus, that comprises the following: obtaining temporal information communicated to the first apparatus; performing one or more of the following checks: a check to determine whether a deviation between temporal information from the clock and the communicated temporal information is less than or less-than-or-equal-to a threshold value that is predefined or determined according to a predefined rule; and synchronizing the clock using the communicated temporal information if all of one or more predefined conditions are satisfied, wherein one of the one or more conditions requires that at least one of the one or more performed check(s) has yielded a positive result.

A method, performed by a first apparatus, that comprises the following: obtaining temporal information communicated to the first apparatus; performing one or more of the following checks: a check to determine whether the first apparatus is in a state after initial startup, after a battery change or after a reset; and synchronizing the clock using the communicated temporal information if all of one or more predefined conditions are satisfied, wherein one of the one or more conditions requires that at least one of the one or more performed check(s) has yielded a positive result.

The availability of a positive check result for at least one of the performed checks is, however, a necessary condition (possibly beside one or more other condition(s)) for a synchronization.

The second apparatus according to the second aspect of the invention, which communicates the temporal information to the first apparatus, may be a portable electronic device, for example. The device is associated with a user (e.g. one for the first apparatus or an apparatus associated with the latter), for example, and is therefore referred to as "user device" below. If the first apparatus is an access control apparatus, then the second apparatus can be used, by way of example, both to communicate the temporal information for synchronization to the first apparatus and to communicate access authorization information to the first apparatus, in order to gain access to the first apparatus or to an apparatus associated with the first apparatus. By way of example, the second apparatus has a graphical user interface and/or a dedicated power supply. By way of example, the second apparatus is a mobile telephone, a Personal Digital Assistant (PDA), a media player (e.g. an iPod) or a navigation device. If the first apparatus is in the form of an access control apparatus for a parcel box, then the second apparatus can belong to a parcel box user, for example, that is to say an owner of the parcel box, for example, or to a person who is permitted to use the parcel box to receive parcels or to place them for pick up by a delivery agent In this context, a delivery agent is not understood to be a user. For example, the second apparatus is configured for wireless communication with the first apparatus, for example via Bluetooth and/or RFID and/or NFC. By way of example, the second apparatus has the ability to use a cellular mobile radio network (e.g. a mobile radio network based on the Global System for Mobile Communication (GSM), the Universal Mobile Telecommunications System (UMTS) and/or the Long Term Evolution (LTE) system) for communication.

Alternatively, the second apparatus may be, by way of example, a portable electronic device of a delivery agent, particularly if the first apparatus is associated with a parcel box as an access control apparatus. This device is subsequently referred to as "delivery agent device". By way of example, the second apparatus then has a graphical user interface and a functionality for the wireless capture of information from parcels, for example by means of optical scanning of parcel labels and/or capture of information from parcels by radio (e.g. RFID) or magnetic fields (e.g. NFC), for example when the parcel has an RFID tag or NFC tag. By way of example, the second apparatus can have the ability to use a cellular mobile radio network for communication, but this may also not be the case. By way of example, the second apparatus can have the ability to use WLAN and/or to use a cellular mobile radio system (particularly to use GPRS) for communication. By way of example, the second apparatus can have the ability to use Bluetooth and/or NFC for communication, for example even by means of appropriate upgrade. An example of a second apparatus is a hand-held scanner, e.g. the Honeywell LXE Tecton MX7.

If the second apparatus (particularly the user device and/or the delivery agent device) communicates with the first apparatus by means of Bluetooth, it is advantageous for the second apparatus to know the Medium Access Control (MAC) address of the first apparatus, since the Bluetooth communication can then be started without the need for time consuming Bluetooth pairings.

Further properties and advantages of the present invention are described below on the basis of exemplary embodiments, the disclosure of which is intended to apply equally to all three aspects of the invention and all respective categories (method, apparatus/system, computer program).

In one exemplary embodiment of all the aspects of the invention, a further one of the one or more condition(s) requires that a second apparatus that communicates the temporal information to the first apparatus has successfully authenticated itself to the first apparatus. Besides at least one ultimately positive check, it is thus necessary for there to be authenticity of the second apparatus if synchronization is meant to take place. By way of example, the first apparatus can check the authenticity of the second apparatus on the basis of information communicated by the second apparatus and information that is present in the first apparatus. When the authenticity of the second apparatus has been determined, the first apparatus can assume that the second apparatus is that apparatus that it is pretending to be and that the first apparatus can then trust, for example. Despite this check on the authenticity, it would fundamentally be possible to perform improper synchronization if, although the second apparatus is identified as authentic by the first apparatus, a user of the second apparatus uses this second apparatus improperly. The inventive checks/conditions for the synchronization are therefore advantageous even in cases in which an authenticity of the second apparatus is checked. By way of example, the authenticity check can advantageously be used for the check to determine whether a synchronization can be performed on the basis of temporal information communicated by the second apparatus and for a check to determine whether a piece of access authorization information communicated from the second apparatus to the first apparatus authorizes access to the first apparatus or an apparatus associated therewith, the authenticity check then needing to be performed only once, however (particularly if both the temporal information and the access authorization information are communicated to the first apparatus in the same communication session).

By way of example, the authentication of the second apparatus to the first apparatus can be based on a third key that forms a symmetric or asymmetric key pair with a fourth key that is present in the first apparatus at least at the time of a check on the authenticity of the second apparatus. By way of example, the key pair may be a symmetric key pair, which means that the first key and the second key are identical. Encryption and decryption using such symmetric keys can be performed according to the Advanced Encryption Standard (AES), DES (Data Encryption Standard), Data Encryption Algorithm (DEA), Triple-DES, IDEA (International Data Encryption Algorithm) or Blowfish methods, for example, to cite just a few examples. Symmetric keys may be chosen on a pseudo random basis, for example. By contrast, with an asymmetric key pair, both keys are different, e.g. in the case of an asymmetric key pair based on the RSA (Rivest, Shamir, Adleman) method or based on the method according to McEliece, Rabin, Chor-Rivest or Elgamal. Methods for generating symmetric and asymmetric keys for generating digital signatures, Message Authentication Codes (MACs) and for encryption and decryption are specified in the publication "Special Publication 800-133 Recommendation for Cryptographic Key Generation" from the National Institute of Standards and Technology (NIST) of the U.S. Department of Commerce.

By way of example, the authentication of the second apparatus is based on the third key such that the first apparatus assumes authenticity of the second apparatus if the latter can demonstrate possession of the third key, for example by virtue of the second apparatus communicating to the first apparatus information that has been generated using the third key. The first apparatus can then check this information using the fourth key, for example, in order to authenticate the second apparatus.

By way of example, it is, however, possible for a plurality of second apparatuses to communicate temporal information to the first apparatus, wherein at least one group of at least two second apparatuses from the plurality of second apparatuses that comprises the second apparatus authenticate themselves to the first apparatus using the same third key. In this case, the third key is thus used to authenticate not a single second apparatus for the first apparatus but rather a group of second apparatuses to the first apparatus. In this case, the opportunity for improper synchronization of a first apparatus is thus limited not to a single second apparatus but rather to an entire group of second apparatuses, which means that there is all the more reason to perform the inventive one or more of the inventive checks and to perform the synchronization only on condition that at least one of these checks has yielded a positive result By way of example, the use of the same third key on a plurality of second apparatuses has the advantage that the generation and distribution of the third key is considerably simplified in comparison with a variant in which the third keys are used on a device-individual basis.

By way of example, the authentication of the second apparatus can comprise performance of cryptographic operations on the temporal information using the third key to obtain check information and communication of the check information to the first apparatus, which can then check, based on the obtained check information, the obtained temporal information and the fourth key, the authenticity of the second apparatus. By way of example, the check information can be communicated to the first apparatus together with the temporal information. The check information is generated by the second apparatus.

By way of example, the third key and the fourth key can form an asymmetric key pair. By way of example, the first check information can then be generated as a digital signature by way of the temporal information using the third key and checked on the first apparatus using the fourth key. The third and fourth keys of the asymmetric key pair are then different. By way of example, the third key is a private key and the fourth key is a public key, or vice versa. By way of example, the key pair may have been generated according to the RSA algorithm. By way of example, the digital signature is formed (particularly in the access authorization generation apparatus) by virtue of a hash value being formed by way of the temporal information, for example according to an algorithm from the Secure Hash Algorithm (SHA) family, as are specified by the National Institute of Standards and Technology (NIST), for example an SHA-1, SHA-224 or SHA-256, to cite just some examples. The hash value is then encrypted using the third key, for example, in order to obtain the check information. Alternatively, the temporal information can also be encrypted without hash value formation. To check the signature, the check information is decrypted using the fourth key, and the hash value obtained as a result is compared with a hash value formed locally by way of the communicated temporal information according to the same algorithm. If the hash values match, then the authenticity of the temporal information (and hence the authenticity of the second apparatus that has communicated the temporal information and the check information) and the integrity (intactness) of the temporal information can be assumed. If no hash value formation takes place, then the temporal information obtained by means of decryption is compared directly with the communicated temporal information.

Alternatively, the key pair formed by the third and fourth keys is a symmetric key pair. The symmetric key pair then comprises the same key twice, for example an AES key, e.g. an AES-128 key. As in the case of an asymmetric key pair, the check information can be generated by means of encryption of the access authorization parameters or of a hash value therefrom using the third key (in the second apparatus). The check is then performed by decrypting the communicated check information using the fourth key (which is identical to the third) and comparing the result with either the communicated temporal information or a hash value for the communicated temporal information, generated locally according to the same algorithm. If there is a match, the authenticity of the temporal information (and hence the authenticity of the second apparatus that has communicated the temporal information and the check information) and the integrity of the temporal information are assumed. By way of example, the encryption/decryption can involve the use of a block cipher, for example with an Electronic Code Book (ECB), a Cipher Block Chaining (CBC), a Cipher Feedback (CFB), an Output Feedback or a counter mode of operation, as are known to a person skilled in the art, in order to allow the encryption/decryption of information that is longer than the block of the block cipher. Depending on the mode of operation (e.g. in the CPC or CFM mode of operation), an initialization vector (IV) may be necessary in this case in addition to the keys for the encryption/decryption. Said initialization vector can either be firmly arranged (and then stored in the first apparatus, for example) or communicated to the first apparatus for each piece of temporal information. Instead of the encryption/decryption of the temporal information or the hash value thereof to obtain the first check information, it is also possible to use a Message Authentication Code (MAC) to generate the first check information, said code being formed by way of the temporal information and likewise taking account of the (in particular symmetric) third key. Examples of MACs are the Message Authentication Algorithm (MAA), the Keyed-Hash Message Authentication Code (HMAC) or the Cipher-Based Message Authentication Code (CMAC), which is specified by the NIST. In the case of an MAC, a kind of hash value for the access authorization parameters is produced in a combined process, for example, and this also takes account of the third key. The result forms the first check information. To check the check information, the first apparatus is used to form the MAC by way of the communicated temporal information using the fourth key (which is identical to the third key) according to the identical specification, and the result, the locally generated check information, is compared with the communicated check information. If there is a match, the authenticity of the temporal information (and hence also of the second apparatus that has communicated this temporal information and the check information) and the integrity of the temporal information are proved.

In one exemplary embodiment of all the aspects of the invention, the first apparatus is used to decrypt information communicated to the first apparatus, which information comprises at least the fourth key encrypted using at least a first key, and the encrypted fourth key using at least a second key to obtain the fourth key. If the fourth key is transmitted to the first apparatus in encrypted form and the first apparatus can decrypt this key, this affords the opportunity for the first apparatus to be able to authenticate a second apparatus that uses the third key for authentication. In this configuration, the third and fourth keys can be interchanged as desired, for example on a daily basis. By way of example, the first apparatus obtains the fourth key in encrypted form together with the temporal information in communicated form, for example within the same communication session. The second key then acts as a trust anchor, said second key being stored invariably in the first apparatus, for example, and forming, together with the first key, a secret that is known only to the first apparatus and a third apparatus that encrypts the fourth key using the first key. The first key may particularly not be known to the second apparatus. The first apparatus then first and foremost trusts that fourth keys that it obtains have been output by the third apparatus and that it can classify second apparatuses that use the third key as trustworthy.

By way of example, the first key may be stored on a third apparatus, wherein the third apparatus generates the information that comprises at least the fourth key encrypted using the first key and communicates this information and the third key to the second apparatus. By way of example, the third apparatus can also generate the third key and the fourth key, for example afresh on a daily basis, so that every day other third and fourth keys are obtained. By way of example, the third apparatus may be an access authorization generation apparatus, particularly a server, that generates access authorization information and communicates it to the second apparatus, so that the second apparatus can use this access authorization information to gain access to the first apparatus or to an apparatus associated therewith, as will be explained in even more detail below. The third key is communicated (for example in unencrypted form) to the second apparatus so that the latter can use the third key for authentication to the first apparatus. By contrast, the fourth key is communicated in encrypted form to the second apparatus for communication to the first apparatus, which then decrypts the encrypted fourth key. Advantageously, by way of example, a trust structure that exists between the third apparatus and the first apparatus, and is represented by the first and second keys, is then thus used in order to communicate to the first apparatus one part (the fourth key) of a key pair (formed by the third and fourth keys) that is required for authenticating the second apparatus to the first apparatus, in order to allow the latter to make authentication of the second apparatus the necessary condition for a synchronization that is based on temporal information communicated by the second apparatus.

By way of example, the first key and the second key form a symmetric or asymmetric key pair. Such key pairs and the associated encryption/decryption mechanisms have already been explained in detail above in the description of the third and fourth keys.

The fourth key can additionally also be used to check information that has been formed by way of access authorization information using the third key on the second apparatus and communicated to the first apparatus, in order to determine that the access authorization information is communicated by the second apparatus and of integrity. The fourth key can thus be used to authenticate the second apparatus on the basis of check information formed by way of the temporal information and on the basis of check information formed by way of access authorization information.

In one exemplary embodiment of all the aspects of the invention, the first apparatus is used to obtain access authorization information communicated to the first apparatus and comprising at least one access authorization parameter that defines a period within which the access authorization information provides authorization to access the first apparatus or an apparatus controlled thereby, and check information communicated to the first apparatus, which check information is generated by the third apparatus by performing cryptographic operations on the access authorization information using the first key, and to decide whether access can be granted, wherein necessary conditions for the granting of access are that, on the basis of an evaluation of the communicated check information in the first apparatus using the second key and the communicated access authorization information, it is determined that the communicated check information has been generated by performing cryptographic operations on the information corresponding to the communicated access authorization information using the first key, and that a check yields that the temporal information from the clock lies in the period defined by the at least one access authorization parameter.

The first apparatus is thus used to obtain communicated access authorization information and communicated check information. For example, both pieces of information are generated by the third apparatus, which may be an access authorization generation apparatus (particularly a server), for example, and communicated to the second apparatus (e.g. directly or indirectly, that is to say via one or more further apparatuses), which then communicates these pieces of information to the first apparatus (e.g. wirelessly). By way of example, the pieces of information can be communicated to the second apparatus by virtue of their being stored on a tag, particularly an NFC tag, (as an example of a second apparatus) or by virtue of their being transmitted via a, by way of example, secure connection to a piece of software ("App") on a user device, particularly a mobile telephone (as an example of a second apparatus) and stored thereon, or by virtue of their being transmitted, for example via a network, to a computer that then transmits the pieces of information by wire (e.g. via a docking station) or wirelessly to a delivery agent device, particularly a hand-held scanner, (as an example of a second apparatus). The check information and the second key can be used to determine on the first apparatus the authenticity and integrity of the access authorization information and check information obtained on the first apparatus (and hence also the authenticity of the third apparatus, from which these pieces of information ultimately come) after these pieces of information have been communicated from the second apparatus to the first apparatus. As already explained above, the check information may be, by way of example, a digital signature or an MAC by way of the access authorization information using the first key and then accordingly be cross-checked on the first apparatus using the second key. The determined authenticity and integrity of the obtained pieces of information are a first necessary condition for the granting of access.

The access authorization information includes one or more access authorization parameters. The one or more access authorization parameters are also referred to as access authorization together in this specification. This covers an access authorization parameter that defines a period (for example limited at one or both ends) within which the access authorization information provides authorization to access the first apparatus or an apparatus controlled thereby. The period can thus be defined by an access authorization parameter (e.g. in the case of predefined periods that are then indexed by the access authorization parameter), or by multiple access authorization parameters. By way of example, a "Not Before date" and a "Not After date" can define such a period as access authorization parameters. Additionally or alternatively, a "Start time for the day" and an "End time for the day" can become involved as access authorization parameters that indicate within what time of day access can be granted. This time-of-day restriction can relate, by way of example, to any day of a period defined by the date statements, or just to the first day for which the "Start time for the day" is stipulated, and the last day for which the "End time for the day" is stipulated. How these time of day statements are intended to be understood is predefined, for example, so that unity prevails. One possible period is thus from 3.27.2014 00:00:00 hours to 3.28.2014 23:59:59 hours (or, in an alternative definition, from 3.27.2014 to 3.28.2014, from 08:00:00 hours to 20:00:00 hours in each case), for example. In these examples, the period was limited at both ends. By way of example, the period may also be defined by only one explicit limit, the other limit being obtained implicitly. By way of example, the period may be defined by the end, that is to say be in the version "to 1.1.2014 23:59:59", and can then be valid from the time of production of the authorization information (implicit start) to this end. In the same way, the start may also be provided explicitly and the end implicitly, for example in the version "from 5.5.2014 23:59:59", which means that the time period ranges from 5.5.2014 23:59:59 to infinity, corresponding to a period limited at one end.

A necessary condition for the granting of access is now that the result of a check is that the temporal information from the clock of the first apparatus lies in the period defined by the at least one access authorization parameter. In the example cited in the previous paragraph, in which the period is defined as from 3.27.2014 00:00:00 hours to 3.28.2014 23:59:59 hours, access is thus granted if the clock of the first apparatus were to indicate 3.28.2014 as the date and 15:00:00 hours as the time of day at the time of the check, since this would lie within the defined period for both examples. If the temporal information from the clock were to indicate 3.29.2014 as the date and 8:00 hours as the time of day, however, access would not be granted. The present access authorization information could thus gain access only if the clock of the first apparatus were put back 8 hours, which would be thwarted both by the second check (in the case of a threshold value of 10 min., for example) and by the third check (on account of the change of date linked to the attempted backward adjustment), however, as described above.

If it is decided that access can be granted, then, by way of example, access is granted, for example by means of a control signal being sent, for example to a lock, for example in order to unlock and/or open a door to one or more spaces (e.g. holding spaces in a holding apparatus) in order to allow access to the one or more spaces. Access can be granted to different extents, for example when multiple holding spaces are present, it is possible for access to be granted merely to particular holding spaces or groups of holding spaces. The extent of the access may be defined in an access authorization parameter of the access authorization information, for example.

Access control performed according to the present exemplary embodiment has a series of advantages. Since the first apparatus and the third apparatus treat the key pair as a secret, the third apparatus is firstly ready and able to produce access authorization information for the first apparatus exclusively itself. The first apparatus can secondly trust the access authorization information generated by the third apparatus. Therefore, it is also possible for the access authorization parameters to be communicated to the first apparatus in fundamentally unencrypted form: the second key in the key pair can be used to confirm the integrity of said access authorization parameters and the authenticity of the access authorization information to a sufficient degree. Since the first apparatus uses local reference information, such as e.g. the temporal information derived from the clock of the first apparatus, to check the communicated access authorization parameters, the first apparatus is essentially autonomous and does not require a network connection. This also reduces power consumption, which is likewise considerable in the case of a battery operated apparatus. Furthermore, the cryptographic operations are performed in the first apparatus on the communicated access authorization parameters, rather than by way of ones that are present locally. This particularly allows the check on the integrity of the obtained pieces of information to be separated from the check on the content thereof. If, by way of example, the "expected" first check information were alternatively computed in the first apparatus and then compared with the communicated first check information, it would be necessary, depending on the granularity of the temporal validity used as an access authorization parameter (e.g. 1 minute, 10 minutes, 1 hour), to form the expected first check information for a plurality of times and compare it with the communicated first check information in order to precisely "hit" the communicated check information with at least one expected piece of first check information. Instead, the integrity of the communicated period is determined in the present case, and this period is compared with the temporal information from the clock of the first apparatus in order to determine much more easily and quickly whether the difference still lies within a predefined tolerance.

In one exemplary embodiment of all the aspects of the invention that is alternative to the previous embodiment, access authorization information communicated to the first apparatus is obtained that comprises at least one access authorization parameter that defines a (in particular limited) period within which the access authorization information provides authorization to access the first apparatus or an apparatus controlled thereby, and a decision is made as to whether access can be granted, wherein a necessary condition for the granting of access is that the result of a check is that the temporal information from the clock lies in the period defined by the at least one access authorization parameter. In this embodiment, in contrast to the embodiment presented previously, no check information is formed by way of the access authorization information and checked on the first apparatus. A check on the period against the temporal information from the clock of the first apparatus does take place, however, and the positive outcome of said check forms a necessary condition for the granting of access. The description of the properties and advantages of the present embodiment, particularly of the definition of the period by the one or more access authorization parameters and the check on the latter in the first apparatus, therefore corresponds to the description pertaining to the previously presented embodiment, with the aspect of the check on the authenticity and the integrity on the first apparatus being omitted.

In the two embodiments described previously, the communicated access authorization information can additionally comprise an access authorization parameter that indicates whether or not synchronization of the clock of the first apparatus can be performed, and wherein a further one of the one or more condition(s) requires that the access authorization parameter indicates that synchronization of the clock of the first apparatus can be performed. The inclusion of an access authorization parameter directed to the admissibility of the synchronization of the clock of the first apparatus in the access authorization information further restricts the opportunities for a potential attacker who wishes to perform improper synchronization of the clock, since he would then also need to manipulate the access authorization parameter or would need to have access authorization information available in which this access authorization parameter is chosen as appropriate so that synchronization can be performed. The manipulation of this access authorization parameter is hampered particularly if cryptographic operations are performed on the access authorization information using the first key in order to generate check information, as is the case in the first of the two embodiments described most recently. By way of example, the access authorization parameter can consist of multiple bits that can be individually set in order to indicate particular rights linked to the access authorization information. By way of example, one bit may be set in order to indicate that synchronization can be performed. By way of example, additionally or alternatively, another bit may be set that indicates that access to the first apparatus or an apparatus controlled thereby needs to be granted, for example in order to open one or more doors of a parcel box. It is thus possible, by way of example, for the case to arise in which the same access authorization information provides authorization for multiple actions, e.g. grants access to the first apparatus or an apparatus controlled thereby and allows synchronization of the clock of the first apparatus.

In one exemplary embodiment of all the aspects of the invention, the communicated access authorization information additionally comprises one or more further access authorization parameters, and wherein a further one of the one or more condition(s) requires a check on each of the one or more further access authorization parameters against respective pieces of reference information that are present in the first apparatus at least at the time of the check to yield that the respective access parameter reflects the validity of the access authorization information. Examples of the further access authorization parameters are an identifier for the first apparatus (which is compared e.g. against an identifier of the first apparatus, which is stored in the first apparatus, as reference information), and/or a number of maximum permitted uses of the access authorization information (which is compared e.g. against a corresponding counter for uses of this access authorization information that have already taken place on the first apparatus). These additional access authorization parameters and the check thereon against respective reference information significantly restricts the freedom of, in particular, abuse of the access authorization information particularly for improper synchronization of the clock.

In one exemplary embodiment of all the aspects of the invention, the synchronization of the clock takes place before the check to determine whether the temporal information from the clock lies in the period defined by the at least one access authorization parameter. This ensures that the clock of the first apparatus is up to date when a check is performed to determine whether the access authorization information is still valid in terms of timing.

In one exemplary embodiment of all the aspects of the invention, the temporal information and the access authorization information are communicated to the first apparatus within the same communication session. By way of example, a communication session is defined by the communication taking place between the set-up of a communication link between the second apparatus and the first apparatus and the cleardown of this communication link between the two apparatuses. By way of example, the communication link may be a wired connection, particularly a Bluetooth connection. Thus, both the access authorization information and the temporal information used to synchronize the clock of the first apparatus are communicated in the same communication session, for example in succession. By way of example, only one-off decryption of the fourth key on the first apparatus is then necessary in this communication session (e.g. on the basis of the second key, as explained above).

In one exemplary embodiment of all the aspects of the invention, the period that is defined by the at least one access authorization parameter corresponds to a day. The access authorization information is then valid for one day (e.g. from 00:00:00 hours to 23:59:59 hours). In this case, both the second check and the third check (albeit alternatively) may be useful, the third check being less computationally complex.

In one exemplary embodiment of all the aspects of the invention, the first apparatus is used to obtain access authorization information communicated to the first apparatus and comprising at least one access authorization parameter that indicates whether or not synchronization of the clock of the first apparatus can be performed, and wherein a further one of the one or more condition(s) requires that the access authorization parameter indicates that synchronization of the clock of the first apparatus can be performed. In this embodiment, in contrast to some of the embodiments described earlier on, it is not necessary for the access authorization information also to include an access authorization parameter that defines a validity period for the access authorization information. As already explained above, the inclusion of an access authorization parameter directed to the admissibility of the synchronization hampers manipulations.

In one exemplary embodiment of all the aspects of the invention, access authorization information communicated to the first apparatus is obtained that comprises at least one access authorization parameter that defines a (in particular limited) period, wherein a further one of the one or more condition(s) requires the communicated temporal information to lie within the period. By way of example, the at least one access authorization parameter may be the at least one access authorization parameter occurring in exemplary embodiments already described that defines a period within which the access authorization information provides authorization to access the first apparatus or an apparatus controlled thereby. The period is then critical both for the possible time of access to the first apparatus and for the possible time of synchronization of the clock of the first apparatus. By way of example, the access authorization information comes from a different apparatus (for example the third apparatus) than the communicated temporal information (which comes from the second apparatus, for example).

In one exemplary embodiment, a further one of the one or more condition(s) requires a date of the communicated temporal information to be later than a date of the time of the last synchronization or setting of the clock (for example setting, which will be described below, of the temporal information from the clock to a time that is obtained from the temporal information from the clock minus or plus a threshold value). As a result, it is possible, by way of example, to avoid multiple synchronization or setting of the clock, which could be used for manipulations, for example, being effected on one day. The date of the time of the last synchronization or setting of the clock—or temporal information from which this date can be obtained—can be stored in the first apparatus on every synchronization or setting of the clock, for example.

In one exemplary embodiment of all the aspects of the invention, the clock of the first apparatus is automatically set to a predefined time, the time of the last synchronization or another time stored in the first apparatus upon initial startup, after a battery change or other power failure or after a reset, and begins to run from said time. By way of example, the predefined time may be Jan. 1, 1970 00:00:00 hours, and the time can then be incremented from this time in steps of one second, so that the temporal information corresponds to a counter of seconds since this time. By way of example, the time of the last synchronization may be stipulated as a time stamp by the clock of the first apparatus and stored in a persistent memory that retains its data even in the event of a power failure. This time can also be represented as a number of seconds since a reference point, for example Jan. 1, 1970 00:00:00 hours. By way of example, the other time stored in the first apparatus may be the most recent time stamp for an entry in an event memory (e.g. a "log" that can be read for analysis purposes) managed by the first apparatus, or a time stamp or time that is stored by the first apparatus at regular or irregular intervals. By way of example, the other time stored in the first apparatus may be a time associated with a state change and/or requested resets in the first apparatus. By way of example, every time (or every n-th time, n being a predefined natural number not equal to 0) the first apparatus changes to a predefined state, particularly an energy saving state, or to an active state (and additionally or alternatively, for example, even when the first apparatus receives a reset signal and then performs a reset), the time of this state change can be stored. By way of example, the time stamp or time can be stored in a manner dedicated to the purpose in order to have the most up-to-date time possible available for resetting the clock of the first apparatus in the event of a battery change or other power failure or a reset. By way of example, the other time may be stored in a persistent memory of the first apparatus and, by way of example, likewise represented as a number of seconds since a reference point, for example Jan. 1, 1970 00:00:00 hours.

In one exemplary embodiment of all the aspects of the invention, the check to determine whether the first apparatus is in a state after initial startup, after a battery change or other power failure or after a reset additionally involves checking whether the communicated temporal information is later than temporal information from a clock of the first apparatus or than the temporal information from the clock of the first apparatus minus (or alternatively plus) a threshold value that is predefined or determined according to a predefined rule, and wherein a positive result of this check is obtained only if it is determined that the apparatus is in a state after initial startup, after a battery change or other power failure or after a reset and the communicated temporal information is later than the temporal information from the clock of the first apparatus or than the temporal information from the clock of the first apparatus minus (or alternatively plus) the threshold value. In this case, the first check is extended to the effect that not only the state after a particular event (initial startup, battery change or other power failure, reset) needs to be determined, but rather additionally the communicated temporal information also needs to be later than the temporal information from the clock of the first apparatus, possibly minus a threshold value (that is to say e.g. a time defined by the communicated temporal information must be after a time defined by the temporal information from the first apparatus (possibly minus a threshold value)). This restricts the manipulation opportunities for an attacker to an even greater extent even in this special operating state of the first apparatus, and may be useful particularly when the clock of the first apparatus, after one of said events, is set not to a (normally long past) standard time but rather to a later time, particularly the time of the last synchronization, which may have only a slight deviation (e.g. a few hours) from the current time, for example.

In one exemplary embodiment of all the aspects of the invention, the predefined rule according to which the threshold value is determined takes account of at least the average target time deviation in the clock per unit time and of the time that has passed since the last performed synchronization or the adjustment of the clock (that is to say, by way of example, the time difference between the time of the last performed synchronization or the adjustment of the clock and the time currently indicated by the clock of the first apparatus). By way of example, the clock can be adjusted on initial startup of the first apparatus, after a battery change or other power failure or after a reset, as has already been explained above. It is subsequently possible for synchronizations either to have taken place or not taken place. If a time T (e.g. in days), for example, has now elapsed since the last performed synchronization or the adjustment of the clock, and the average target time deviation in the clock per unit time (e.g. day) is D, the rule for determining the threshold value K can be determined as K=m*T*D+L, for example, where T*D is the average absolute target time deviation to be expected, m is a safety factor that is intended to compensate for the variance in the average target time deviation and to ensure that K is not chosen to be too small, and L is a constant value that is intended to take account of the delay generated by the communication of the temporal information from the second apparatus to the first apparatus and the processing of said information in the first apparatus. By way of example, the factor m can be chosen to be greater than 1 and less than 10, e.g. as 5. By way of example, the value L can be ascertained by means of measurements of the average transmission time and processing time, and may be between 1 s and 10 minutes, for example. If the average target time deviation in the clock of the first apparatus is now D=0.5 s/day, for example, and T=10 days have passed since the last synchronization or the adjustment of the clock of the first apparatus, selection of m=5 and L=5 min. would yield the threshold value K=25 s+300 s=325 s. The summand m*T*D in K, which is influenced by the target time deviation in the clock, can become more significant in the case of synchronization or adjustment of the clock that is further in the past If the clock of the first apparatus has not been synchronized for a period of T=60 days, for example, then a threshold value K=150 s+300 s=450 s is obtained with the above assumptions for D, m and L. The determination of a threshold value according to a predefined rule thus allows the time period within which synchronization of the temporal information from the clock of the first apparatus can be adjusted to be narrowed down to the extent that makes technical sense, and hence allows a balance to be obtained between greatest possible security against attacks and technical need for synchronization to a necessary extent.

In one exemplary embodiment of all the aspects of the invention, if the result of the check is that the deviation between the temporal information from the clock and the communicated temporal information is not either less than or less-than-or-equal-to the threshold value, then the following is performed:

setting of the clock to a time that is obtained from the temporal information from the clock minus the threshold value if the communicated information is less than the temporal information from the clock minus the threshold value; and setting of the clock to a time that is obtained from the temporal information from the clock plus the threshold value if the communicated information is not less than the temporal information from the clock minus the threshold value.

Although the result of the second check means that synchronizing the clock using the communicated temporal information is thus not possible, the clock is nevertheless adjusted at least in the direction of the communicated temporal information, but only to an extent that is limited by the threshold value. By way of example, provision may be made for such setting of the clock to be able to take place only once per day in order to avoid manipulations. By way of example, this can take place by virtue of a further one of the one or more condition(s) requiring a date of the communicated temporal information to be later than the date of the time of the last synchronization or setting of the clock, as has already been described above.

In one exemplary embodiment of all the aspects of the invention, the temporal information is obtained from a clock of a second apparatus and wirelessly communicated to the first apparatus. By way of example, the clock of the second apparatus may be an electronic clock. By way of example, the clock of the second apparatus can be synchronized by temporal information that is received from a fourth apparatus. By way of example, this may be an apparatus via which the second apparatus obtains the access authorization information. By way of example, the fourth apparatus can synchronize the clocks of multiple second apparatuses. If the second apparatus is a delivery agent device, particularly a hand-held scanner, then the fourth apparatus may be a delivery base personal computer (ZBPC), for example. By way of example, the fourth apparatus may have a radio clock (that is to say a clock readjusted by means of signals received from a time signal transmitter such as e.g. the DCF-77) or have its timing synchronized by means of a network synchronization service (e.g. pool.ntp.org). By way of example, the third apparatus, which generates the access authorization information, can use the same type of time synchronization (e.g. a radio clock or a network synchronization service, such as e.g. pool.ntp.org). This ensures that the first apparatus and the third apparatus use the same time. The synchronization of the fourth apparatus can also be accomplished by time signals received from the third apparatus, however, regardless of whence the third apparatus obtains its time.

In one exemplary embodiment of all the aspects of the invention, the first apparatus controls access to a container, particularly a parcel box. By way of example, the locking and/or unlocking of one or more doors to one or more compartments of the container can be controlled.

In one exemplary embodiment of all the aspects of the invention, the second apparatus is an electronic portable device of a delivery agent for shipments (e.g. parcels or letters), particularly a hand-held scanner.

In one exemplary embodiment of all the aspects of the invention, the temporal information is communicated to the first apparatus by means of wireless communication, particularly via Bluetooth or NFC.

The exemplary embodiments and exemplary refinements, described above, of all the aspects of the present invention are also intended to be understood as disclosed in all combinations with one another.

BRIEF DESCRIPTION OF THE SEVERAL VIEWS OF THE DRAWING

Further advantageous exemplary refinements of the invention can be found in the detailed description that follows for a few exemplary embodiments of the present invention, particularly in conjunction with the figures. The figures accompanying the application are intended to be used only for the purpose of clarification, however, rather than for determining the scope of protection of the invention. The accompanying drawings are not necessarily to scale and are intended to reflect the general concept of the present invention by way of examples. In particular, features included in the figures are in no way intended to be regarded as a necessary part of the present invention.

In the drawings.

DETAILED DESCRIPTION OF THE INVENTION

Figure 1:
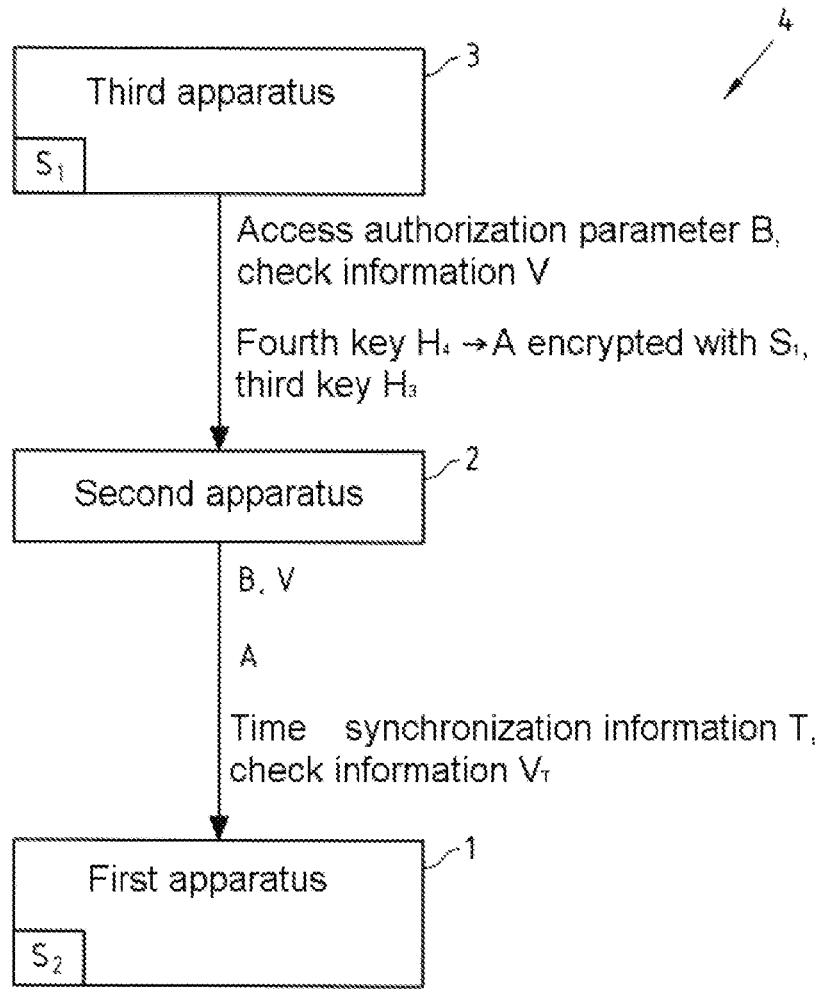
FIG. 1 shows a schematic illustration of an exemplary embodiment of a system according to the present invention.

An overview of a system 4, in which exemplary embodiments of the first apparatus 1 and of the second apparatus 2 of the present invention can be used, is shown in FIG. 1. The system 4 comprises a third apparatus 3 (e.g. an access authorization generation apparatus), a second apparatus 2 (e.g. an access authorization verification apparatus) and a first apparatus 1 (e.g. an access control apparatus). Particularly the second apparatus 2 and the first apparatus 1 may be present more than once, but to simplify the illustration are each represented only a single time. The components 1 and 2 are respective exemplary apparatuses according to the first and second aspects of the invention, the properties of which have already been outlined in detail. FIG. 1 therefore serves primarily to clarify which keys are stored in the individual components and which information is interchanged between the components. The third apparatus 3 stores particularly the first key $S_1$, which forms a key pair $(S_1, S_2)$ with a second key $S_2$ in the first apparatus 1. This pair can form a symmetric or asymmetric key pair, with both keys being the same in the case of a symmetric key pair, that is to say e.g. $S_1=S_2=S$ is true, and in the case of an asymmetric key pair $S_1 \neq S_2$ is true.

The third apparatus 3 generates and transmits the following information to the second apparatus 2:

access authorization information B and first check information V, the fourth key $H_4$, encrypted using $S_1$, as part of the information A, and a third key $H_3$.

These pieces of information can be transmitted, for example at least in part (or in full), between the third apparatus 3 and the second apparatus 2 within the same communication session (that is to say, by way of example, between the setup and the cleardown of a communication link between the third apparatus 3 and the second apparatus 2), or in different communication sessions.

These pieces of information can be transmitted from the third apparatus 3 to the second apparatus 2 at least in part wirelessly (e.g. by mobile radio or WLAN), particularly if the second apparatus 2 is a portable user device (e.g. a mobile telephone) or a portable delivery agent device (e.g. a hand-held scanner). In this case, the transmission does not need to take place directly, but rather can take place via one or more intermediate stations, as discussed in even more detail below. If the second apparatus 2 is a tag (e.g. an RFID or NFC tag), then the transmission of the information can be understood logically and can mean, by way of example, that the information is transmitted to a server of a production system for the tags and is stored in the tags therein.

In this case, the third key $H_3$ and the fourth key $H_4$ in turn form a key pair $(H_3, H_4)$ that may be symmetric, for example, that is to say $H_3=H_4=H$, or asymmetric, that is to say $H_3 \neq H_4$.

Of the information that is transmitted from the third apparatus 3 to the second apparatus 2, fundamentally all the information, apart from the third key $H_3$, is communicated onward from the second apparatus 2 to the first apparatus 1 and then used in the first apparatus 1 to check whether this information is authentic and of integrity and whether—in the case of the access authorization information B—the user can be granted access to the second apparatus 2.

In this case, the third key $H_3$ is stored in the second apparatus 2 and, by way of example, used as part of the reciprocal authentication between the second apparatus 2 and the first apparatus 1, the latter having received a transmission of the counterpart of the third key $H_3$, namely the fourth key $H_4$, in encrypted form (information A) and at least intermittently storing said fourth key after decryption.

In addition, temporal information T (also referred to as time synchronization information T) is transmitted with an associated piece of check information between the second apparatus 2 and the first apparatus 1 (and only between these, for example).

Figure 2:
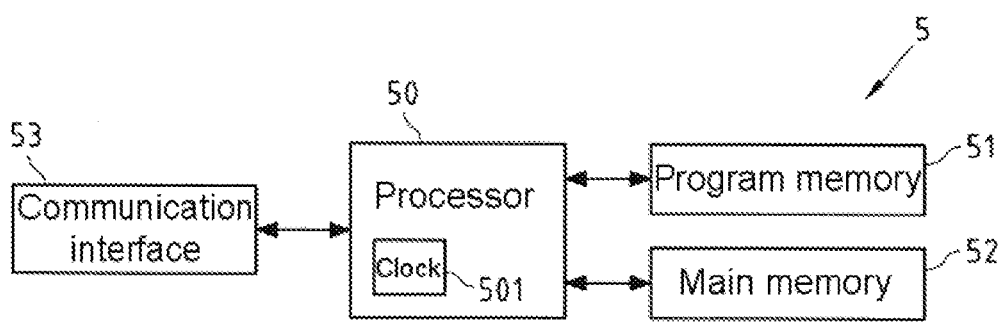
FIG. 2 shows a schematic illustration of an exemplary embodiment of an apparatus according to the present invention.

FIG. 2 shows a schematic illustration of an exemplary embodiment of an apparatus 5 according to the present invention. By way of example, apparatus 5 can represent the second apparatus 2 or the first apparatus 1 in FIG. 1.

Apparatus 5 comprises a processor 50 having an associated main memory 52 and program memory 51. By way of example, the processor executes program instructions that are stored in the program memory 51. The program instructions perform the method according to the first or second aspect of the invention and/or control said method. Hence, the program memory 51 contains a computer program according to the first or second aspect of the invention and is a computer program product for storage thereof.

The processor 50 comprises a clock 501, for example a realtime clock. However, the clock 501 may also be a unit that is separate from the processor 50. By way of example, the clock 501 can measure the date and time, for example with a resolution of seconds or hundredths of seconds. However, the clock 501 may have a target value deviation, that is to say a deviation between the time indicated by the clock and an actual time. According to exemplary embodiments of the invention, the clock 501 is therefore synchronized to external temporal information, for example by virtue of the external temporal information being adopted as new temporal information for the clock.

By way of example, the program memory 51 may be a persistent memory, such as a Read Only Memory (ROM), for example. The program memory may be permanently connected to the processor 50, for example, but may alternatively also be detachably connected to the processor 50, for example as a memory card, floppy disk or optical data storage medium (e.g. a CD or DVD). The program memory 51, or a separate memory, may also store further information. If apparatus 5 is the second apparatus 2, it is to possible to use the program memory 51 to store information obtained from the third apparatus 3, for example (particularly B, V, A, $H_3$). If apparatus 5 is the first apparatus 1, the information stored in the program memory 51 can include the key $S_2$ and also reference information that is used to check obtained access authorization parameters to determine whether they each provide authorization to grant access (e.g. an identifier for the access control apparatus, etc.).

By way of example, the main memory 52 is used to store temporary results during the execution of the program instructions; by way of example, it is a volatile memory, such as a Random Access Memory (RAM), for example.

In addition, the processor 50 is operatively connected to a communication unit 53 that allows information interchange with external apparatuses, for example.

If the apparatus 5 represents the second apparatus 2 in the form of a user device or delivery agent device, then the communication unit 53 can comprise the following, for example:

a mobile radio interface for receiving information from the third apparatus 3 (which has passed this information to an interface server of a mobile communication network, for example, for transmission to the second apparatus 2), an interface for wireless (e.g. by WLAN) or wired reception (e.g. via a docking station) of information from a fourth apparatus (for example a delivery base personal computer (ZBPC)), to which the third apparatus 3 has transmitted this information for transmission to the second apparatus 2), a radio interface for communication with the access control apparatus 2, particularly a Bluetooth interface and/or an RFID interface and/or NFC interface.

If the apparatus 5 represents the second apparatus 2 in the form of a tag, then the communication unit 53 can comprise the following, for example:

a radio interface for communication with the first apparatus 1, particularly a Bluetooth interface and/or an RFID interface and/or an NFC interface.

The apparatus 5 can also contain further components, for example a graphical user interface, in order to allow a user to interact with the apparatus 5, particularly if apparatus 5 is a third apparatus 3 in the form of a user device or delivery agent device. If apparatus 5 represents a delivery agent device, then it is possible, by way of example, for a unit for, in particular, optical capture of information (e.g. a scanner) to be comprised by the apparatus 5, and/or, by way of example, a user interface for capturing handwritten inputs, such as e.g. a signature.

If apparatus 5 represents a first apparatus 1, it is likewise possible for a, by way of example, visual and/or audible user interface to be provided, for example in order to be able to output to the user information about the status of the first apparatus 1 and/or of an attempt to use access authorization information to be granted access to the first apparatus 1. In the case of a first apparatus 1, the apparatus 5 can also comprise control means for controlling a locking unit (e.g. for unlocking same) on the basis of the decision as to whether access can be granted. By way of example, the locking unit can comprise an, in particular electronically, actuatable lock. Within the context of the description of the exemplary embodiments of FIG. 1-2, a unit comprising at least the processor 50, the memories 51 and 52 and the locking unit is referred to as a "lock". In the case of a first apparatus 1, the apparatus 5 may additionally also comprise one or more sensors, for example for detecting a current locking state of the locking unit. In the case of a first apparatus 1, the apparatus 5 can comprise a battery (e.g. rechargeable or otherwise), for example, particularly as the only power supply. In the case of a first apparatus 1, the apparatus 5 may have no connection to a wired network, for example, that is to say particularly no connection to an LAN, and/or may have no connection to a WLAN or a mobile radio network (particularly a cellular mobile radio network), for example.

In the case of a second apparatus 2 in the form of a tag, the apparatus 5 may comprise no dedicated power supply, for example, and obtain its power for communication from the field of a reading unit of the first apparatus 1. Such a tag may also have no user interface.

By way of example, the components 50-53 may be in the form of a module or unit together, or may at least in part be in the form of single modules in order to ensure ease of replacement in the event of any defects.

Figure 3A:
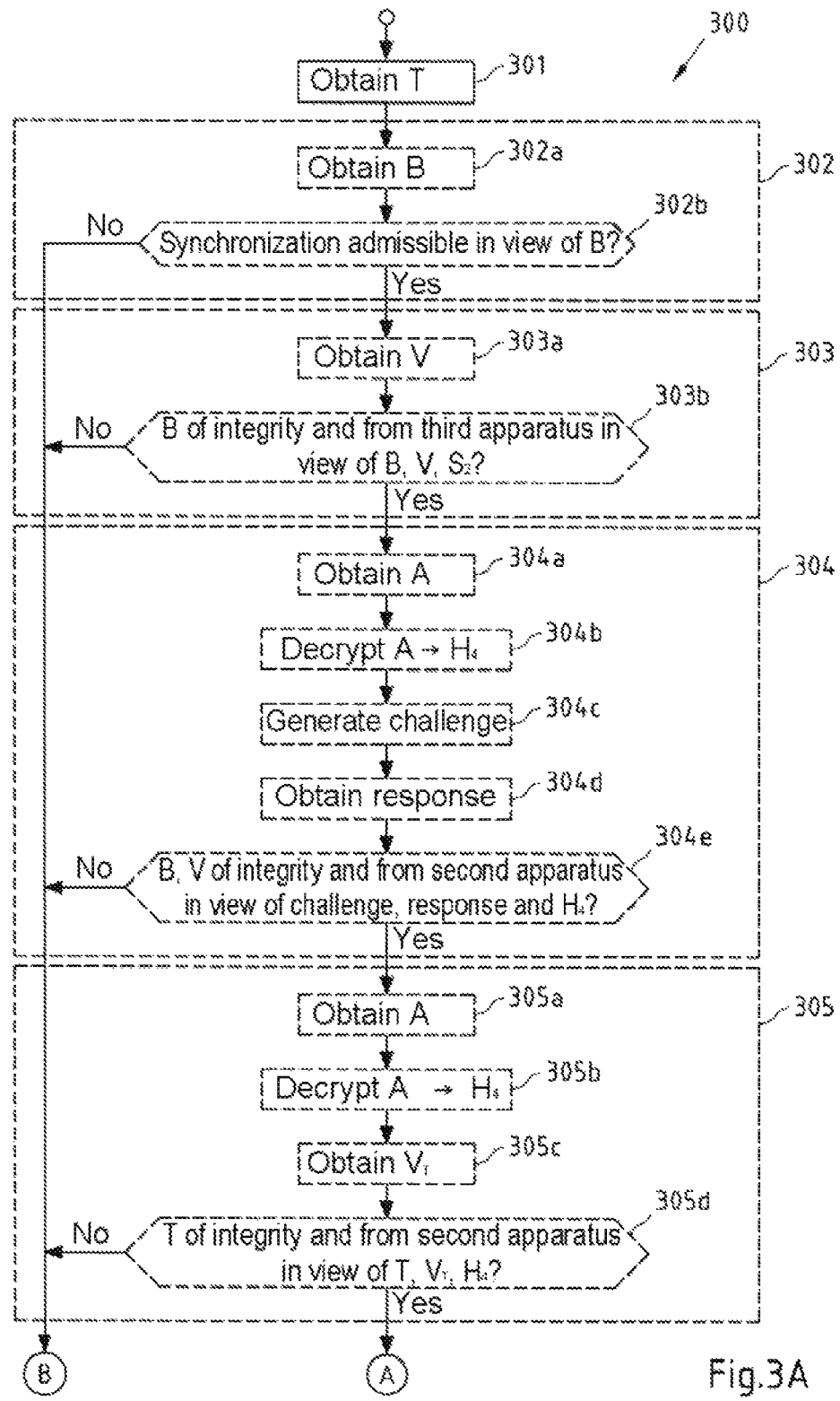
FIG. 3A/B shows a flowchart, extending over two figures, for an exemplary embodiment of a method according to the present invention.

FIG. 3A/B shows a flowchart for an exemplary embodiment of a method 300 according to the present invention. By way of example, the method is performed by the first apparatus 1 in FIG. 1, for example by the processor 50 thereof (see FIG. 2), in which case the program memory 51 can contain program code that moves the processor 50 to perform or control the method 300.

In FIG. 3A/B, optional method steps are shown in dashed lines and steps that are necessary—at least for this embodiment, not necessarily for the invention per se—are shown by solid lines. Particularly the actions of steps 302, 303, 304, 305, 306 and 309 are optional in this case. If these are not present, the flowchart starts directly at step 306, for example. Accordingly, the flowchart in FIG. 3A/B is also intended to be understood as disclosed merely such that it begins with step 306 in FIG. 3B and the encircled connecting element to the steps in FIG. 3A does not exist In a step 301, temporal information T is first of all received on the first apparatus 1, for example via the communication interface 53 of the first apparatus 1. This temporal information T comes particularly from the second apparatus 2 and contains e.g. the date captured from a clock of the apparatus 2 and the time of day at the time of capture.

Optionally, a step 302 having substeps 302a-302b can then follow if the second apparatus 2 communicates access authorization information B to the first apparatus 1. The access authorization information B would then, in step 302a, be obtained on the first apparatus 1 (step 302a) and, in step 302b, checked to determine whether there is an access authorization parameter in the access authorization information that indicates that synchronization of the clock 501 of the first apparatus is permissible. By way of example, such an access authorization parameter is the access authorization parameter "Permissions", which will be discussed later. If step 302b determines that there is authorization for synchronization, then the flowchart 300 progresses to step 303a, otherwise execution is terminated and the process skips to the end of the flowchart 300.

In step 302b, it is optionally also possible for one or more further access authorization parameters from B to be compared against respective reference variables in order to determine that the access authorization information is valid and hence also synchronization is permissible. By way of example, the access authorization parameters LockID (that is to say an, in particular, explicit identifier for the lock) and/or MaxUses (that is to say an upper limit for the number of permitted uses) that the access authorization information contains can be cross-checked against respective reference information that is present in the first apparatus 1 at least at the time of the check (e.g. LockID stored therein, counter corresponding to MaxUses therein), and valid access authorization and the permissibility of the synchronization can be assumed only if there is a match (in this regard cf. the description of step 404 of the flowchart 400 in FIG. 5 below). Further access authorization parameters that the access authorization information potentially contains and that indicate the temporal validity of the access authorization (e.g. beginning and end of the validity period) are preferably not checked during the check to determine whether there is a permissible access authorization available and hence synchronization of the clock is permissible, since in that case there would be a risk of the access authorization no longer being regarded as valid in respect of timing—for example owing to a severe target time deviation in the clock—and making synchronization impossible. The disadvantage that the access authorization is valid for the synchronization more or less without any time limit—owing to the lack of consideration of the access authorization parameters that define the validity period—can be brought under control by virtue of the invention setting narrow limits for the degrees of freedom for performing synchronization—and hence for possible misuse—as explained below for steps 306-310.

However, in step 302b, it is optionally possible, in addition to the check to determine whether there is an access authorization parameter in the access authorization information that indicates that synchronization of the clock 501 of the first apparatus is permissible, to check whether the temporal information T lies within a validity period for the access authorization that is indicated (e.g. in the form of information for the beginning and end of the validity period) by one or more access authorization parameters that the access authorization information contains, for example. By way of example, it is then necessary for both the check to determine whether there is an access authorization parameter in the access authorization information that indicates that synchronization of the clock 501 of the first apparatus is permissible and the additional check to determine whether the temporal information T lies within the validity period for the access authorization to proceed successfully so that step 302b delivers a positive check result overall, that is to say that step 303a is performed rather than there being a direct branch to the end of the flowchart 300. By way of example, the additional check is used to check the consistency of the temporal information for the validity period of the access authorization, which is advantageous, by way of example, because the validity period and the temporal information come from different entities. By way of example, this can prevent an erroneous clock of the second apparatus from causing erroneous synchronization of the clock of the first apparatus to take place, because the temporal information does not match the validity period of the access authorization information produced by the second apparatus. In this case, the validity period does not necessarily need to concern the provision of access (e.g. to the first apparatus or an apparatus controlled thereby), but rather can concern exclusively the performance of synchronization, for example. The access authorization information may thus not authorize access, for example, but may very well allow synchronization of the clock and stipulate the period (validity period) in which this is meant to be possible. However, it is equally well possible for the validity period to stipulate both when access is possible and when synchronization (and/or setting) of the clock is possible.

By way of example, it is possible to check whether the temporal information is greater than or greater than or equal to a "NotBefore" variable and at the same time less than or less-than-or-equal-to a "NotAfter" variable. In this case, the "NotBefore" variable corresponds for example to the "NotBeforeDate" access authorization parameter discussed in even more detail below (for example when the validity period is indicated only with an accuracy of one day) or to a combination of the "NotBeforeDate" and "StartTimeOfDay" access authorization parameters defined with even greater accuracy below (for example when the validity period is specified more finely than with an accuracy of one day, e.g. with an accuracy of one hour or with an accuracy of one minute). In this case, the "NotAfter" variable corresponds to the "NotAfterDate" access authorization parameter discussed in even more detail below or to a combination of the "NotAfterDate" and "EndTimeOfDay" access authorization parameters defined even more accurately below, for example.

Additionally or alternatively, in step 302b it is possible to check whether the date of the temporal information T is later than the date of the last synchronization. By way of example, this can prevent synchronization from taking place more than once a day. By way of example, this may be disadvantageous in view of steps 312 and 313 in FIG. 3C. By way of example, a variable that specifies the time of the last synchronization in each case or at least the date of the last synchronization may be stored in the first apparatus 1, for example as a piece of reference information. By way of example, this variable can be updated each time the local time $T_{local}$ of the clock 501 of the first apparatus is synchronized. By way of example, the variable is set to the same value for each synchronization as the (synchronized) local time $T_{local}$ of the clock 501. By way of example, the setting of this variable can thus take place in step 310 of FIG. 3B or in steps 310, 312 or 313 of FIG. 3C.

By way of example, both the check to determine whether there is an access authorization parameter in the access authorization information that indicates that synchronization of the clock 501 of the first apparatus is permissible and the check to determine whether the date of the temporal information T is greater than the date of the last synchronization (and, by way of example, also the check to determine whether the temporal information T lies within the validity period for the access authorization) then need to be successful in order for step 302b to deliver a positive check result overall, that is to say that step 303a is performed and the process does not branch directly to the end of the flowchart 300.

The check on the further access authorization parameters, which indicate the temporal validity of the access authorization, against the clock of the first apparatus 1 can naturally also be performed after the synchronization of the clock, however, particularly when the access authorization authorizes both synchronization and access to the first apparatus 1 or to an apparatus controlled thereby.

Alternatively, it is conceivable for the check on the further access authorization parameters, which indicate the temporal validity of the access authorization, against the clock of the first apparatus to be performed before the synchronization with the temporal information that the access authorization contains, and for the synchronization to be performed only if the access authorization is determined as valid in respect of timing too. Should a target value deviation in the clock be so great that the temporal information from the clock no longer lies in the validity interval defined by the further access authorization parameters and hence the access authorization is regarded as invalid overall, then it is possible, by way of example, to use access authorization (in particular intended specifically only for synchronization) with a significantly extended validity period in order to synchronize the clock.

Step 303 is in turn an optional step with substeps 303a-303b that is able to be performed, by way of example, if the access authorization information obtained in step 302a has been provided with check information V (e.g. as an MAC or digital signature) by the third apparatus 3 using the first key. Such check information V would then be received in step 303a, and the check would then be performed in step 303b on the basis of B, V and $S_2$ to determine whether B is of integrity and comes from the third apparatus 3 (that is to say is also authentic in respect of the third apparatus 3). If this is not the case, the execution is terminated and the process skips to the end of the flowchart 300, otherwise the flowchart 300 advances to the next step 304a.

Step 304 is in turn an optional step with substeps 304a-304d that is able to be performed, by way of example, if an authentication method in the form of a challenge/response method is performed between the first apparatus 1 and the second apparatus 2. This is based on knowledge of the key $H_3$ in the second apparatus 2 and on knowledge of the fourth key $H_4$ in the first apparatus 1. In step 304a, this involves obtaining a piece of authentication information A that contains the fourth key $H_4$ in encrypted form (encrypted using the first key $S_1$). In step 304b, A is decrypted using $S_2$ in order to obtain $H_4$. A challenge (e.g. as a random character string, for example as a binary random character string) is then generated and a response to the challenge is obtained in step 304d. The response is generated in the second apparatus 2, for example using the key $H_3$, as a cryptographic operation on the challenge and the pieces of information B and/or V, for example as an MAC or digital signature. In step 304e, B and/or V, the challenge, the response and $H_4$ are then used to check whether B and/or V are of integrity and come from the second apparatus 2 (that is to say are authentic in respect of the second apparatus 2). If this is not the case, the execution is terminated and the process skips to the end of the flowchart 300, otherwise the flowchart 300 advances to the next step 305a.

Step 305 is in turn an optional step with substeps 305a-305c that is able to be performed, by way of example, if the second apparatus 2 computes a piece of check information $V_T$ by way of the temporal information T, which the first apparatus can use to check the integrity and authenticity of the temporal information T. This may in turn involve a digital signature or an MAC for the temporal information, for example, which are computed using the third key $H_3$. In step 305a, this involves the authentication information A too being received—if this has not already happened in the optional step 304a. Then, in step 305b, the fourth key $H_4$ would be obtained by decrypting A using $S_2$—if this has not already happened in the optional step 304b. In step 305c, the check information $V_T$ would then be received. In step 305d, T, $V_T$ and $H_4$ would then be used to check whether T is of integrity and comes from the second apparatus 2 (that is to say is authentic in respect of the second apparatus 2). If this is not the case, the execution is terminated and the process skips to the end of the flowchart 300, otherwise the flowchart 300 advances to the next step 306.

Step 306 is optional and is performed only if in the next step 307, instead of a predefined threshold value D (e.g. 10 min.), a (dynamic) threshold value D determined according to a predefined rule is intended to be used. By way of example, the threshold value D determined in step 306 may be dependent at least on a time that has elapsed since the last synchronization or the adjustment of the clock 501 of the first apparatus 1 and on an average target value deviation per unit time, as has already been explained.

In step 307, either the threshold value D determined in step 306 or a predefined threshold value D is then used to check whether a deviation between the received time T and the local time $T_{local}$ from the clock 501 of the first apparatus is less-than-or-equal-to the threshold value D. This corresponds to the "second check" already discussed above. If this second check attains a positive result in step 308, synchronization of the local temporal information $T_{local}$ with the received temporal information T can take place (step 310). Otherwise, a check is performed ("first check"), in step 308 to determine whether the presence of a special state (first apparatus 1 is in a state after initial startup, after a battery change or other power failure or after a reset) does not justify permitting synchronization despite a relatively great temporal deviation between T and $T_{local}$. Should such a state be present, it is either possible for the local temporal information $T_{local}$ from the clock 501 of the first apparatus 1 to be synchronized with the received temporal information T in step 310, or for the further optional checking step 309 to be performed beforehand, in which a check is performed to determine whether the received time T is equal to or later than the local time $T_{local}$. If this is not the case, the synchronization can be denied and the process can skip to the end of the flowchart 300. Otherwise, the synchronization is performed in step 310.

Alternatively, it is possible to check, for example in step 309, whether the received time T is equal to or greater than the difference $T_{local}$–D between the local time $T_{local}$ and the threshold value D. As a result, this alternative check thus also takes account of a tolerance embodied by the threshold value D. If this is not the case, the synchronization can be denied and the process can skip to the end of the flowchart 300. Otherwise, the synchronization is performed in step 310.

The order of the steps performed in the flowchart 300 (including the optional steps and their respective steps among one another) is not binding. By way of example, the "first check" 308 (possibly with step 309) can take place before the "second check" 307. The optional steps 302-305 can also have their order swapped. In this case, it should particularly be noted that the pieces of information B, V, V', A, T, $V_T$ do not necessarily have to be received separately from one another; by way of example, these pieces of information can be received together at least in groups of two or more pieces of information, and can all be communicated from the second apparatus 2 to the first apparatus 1 in the same communication session, for example.

Instead of the "second check" in step 307, it is also possible to perform the simplified "third check" already explained, by virtue of which a check is merely performed to determine whether T and $T_{local}$ have the same date and synchronization is permitted if they do have the same date. The "second check" in the step would then otherwise be left unaltered merely by the "third check" and the flowchart 300.

Figure 3B:
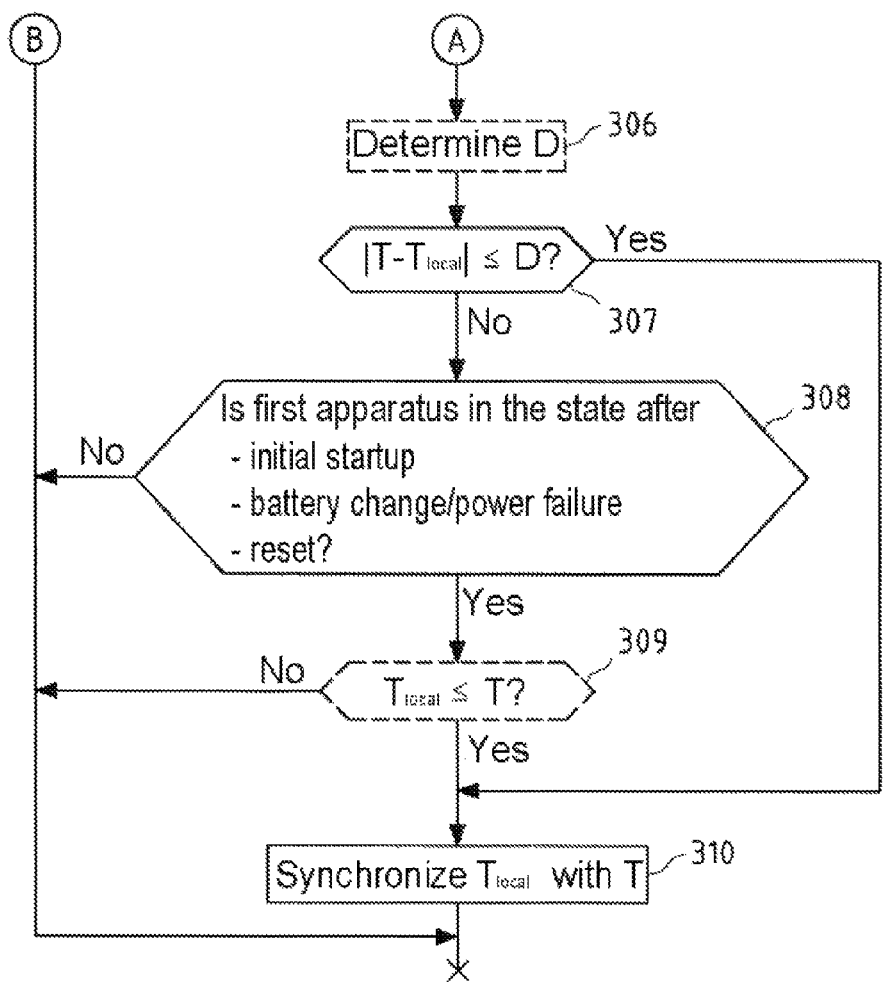
FIG. 3C shows an alternative end for the flowchart shown in FIG. 3A/3B according to an exemplary embodiment of a method according to the present invention.
Figure 3C:
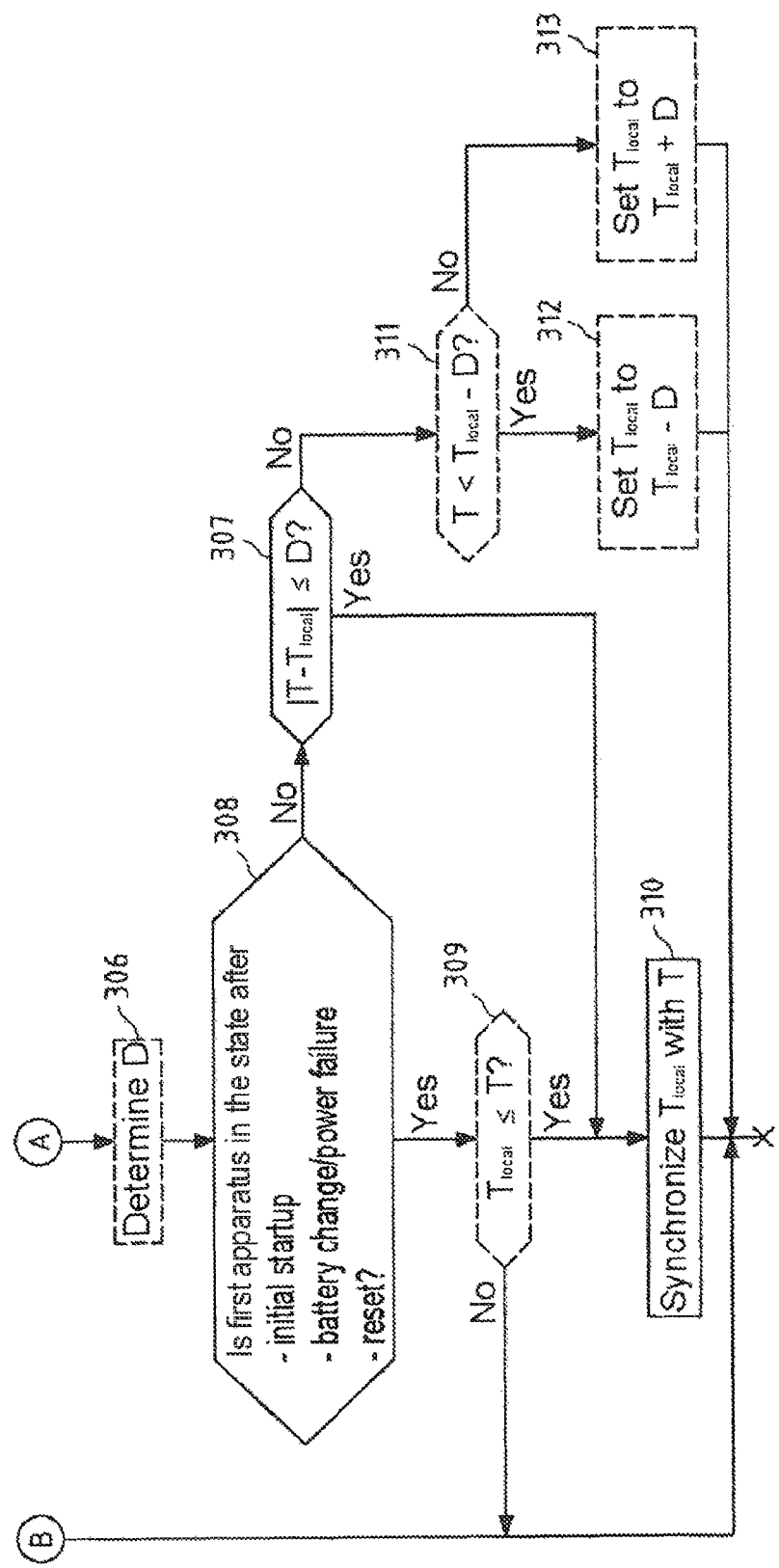

FIG. 3C shows an alternative end for the flowchart 300 in FIG. 3A/3B. In other words, FIG. 3A and 3C form an embodiment of a method according to the present invention that is an alternative to the flowchart 300 in FIG. 3A/3B. By way of example, the method is in turn performed by the first apparatus 1 in FIG. 1, for example by the processor 50 thereof (see FIG. 2), the program memory 51 then being able to contain program code that moves the processor 50 to perform or control the method.

In FIG. 3C, blocks that correspond to those in FIG. 3B are provided with the same reference symbols.

In a step optional step 306, a threshold value D is in turn determined, as shown in FIG. 3C, if a predefined threshold value D is not used, as has already been described above with reference to FIG. 3B. Step 306 is followed by step 308, which is embodied as in FIG. 3B. For a positive check result in step 308, the optional step 309 is performed, which has already been described above with reference to FIG. 3B. If the check in step 309 has a positive outcome—or if step 309 is not present—then step 310 is performed and synchronization of the local time $T_{local}$ is performed using the temporal information T, that is to say the local time $T_{local}$ is set to the value of the temporal information T, for example. If the check in step 309 has a negative outcome, then by contrast no synchronization using the temporal information T takes place.

In contrast to FIG. 3B, a negative check result in step 308 does not cause a branch to the end of the method (that is to say no synchronization is performed), but rather causes a branch to step 307, which, in terms of the function, in turn corresponds to step 307 in FIG. 3B. A positive check in step 307 causes the method to branch to step 310.

If the check in step 307 has a negative outcome, that is to say that the deviation between the temporal information T and the local time $T_{local}$ is greater than the threshold value D, then it is optionally possible for steps 311-313 to follow (otherwise the method can then branch to the end without synchronization). In steps 311-313, although no synchronization is performed using the temporal information T (in contrast to step 310), correction of the local time $T_{local}$ is performed at least within the limits set by the threshold value D. To this end, step 311 involves performing a check to determine whether the temporal information is less than the difference $T_{local}$–D. If this is the case, the local time $T_{local}$ is set to the value $T_{local}$–D in step 312 (that is to say the current local time $T_{local}$ reduced by the value D). If this is not the case, the local time $T_{local}$ is set to the value $T_{local}$+D in step 313 (that is to say the current local time $T_{local}$ increased by the value D). Hence, correction of the local time $T_{local}$ in the direction of the temporal information T thus takes place, but only within the limits set by the threshold value D. In a given case, this may still be sufficient to correct an only slightly errant clock of the first apparatus to a value ($T_{local}$–D or $T_{local}$+D), which, although it does not correspond to the value T, nevertheless means that the updated local time $T_{local}$ is now within the validity period of the access authorization and, by way of example, access can be granted (if appropriate authorization is available in the "Permissions"), in this regard see step 1106 in FIG. 5.

The text below refers to FIG. 4 in order to present a substantiated exemplary embodiment of an access control system 6 in which embodiments of the first, second and third aspects of the invention can be used. In the case of this access control system 6, the third apparatus 3 is in the form of a key server 60 (see FIG. 4), the first apparatuses 1 are in the form of parcel boxes 69 (or the access-controlling units thereof, particularly "locks") that are associated with users 63 (e.g. users registered for use of the parcel boxes), and the second apparatuses 2 are in the form of hand-held scanners 68 or tags 74 of delivery agents 70 or in the form of mobile telephones 61 or tags 62 of users 63, which are referred to collectively as "tokens". In this case, the users 63 are, by way of example, the owners of parcel boxes or other persons (e.g. from the same household or the neighborhood) who have registered in order to be able to receive shipments in a particular parcel box 69 or to have said shipments picked up therefrom. The users 63 are also referred to as parcel box users. By way of example, the delivery agents 70 may be parcel delivery agents, combined delivery agents (who deliver both mail and parcels) or mail delivery agents. For the parcel delivery agents and combined delivery agents, it is important, by way of example, to be able to open the parcel box in order to be able to deliver parcels thereto or pick up parcels therefrom. For combined delivery agents and mail delivery agents, it is important, by way of example, to be able to open the parcel box in order to be able to deliver large-format letters (e.g. maximum-sized letters), which sometimes do not fit through a mail slot in the parcel box, to the parcel box by opening the latter.

Figure 4:
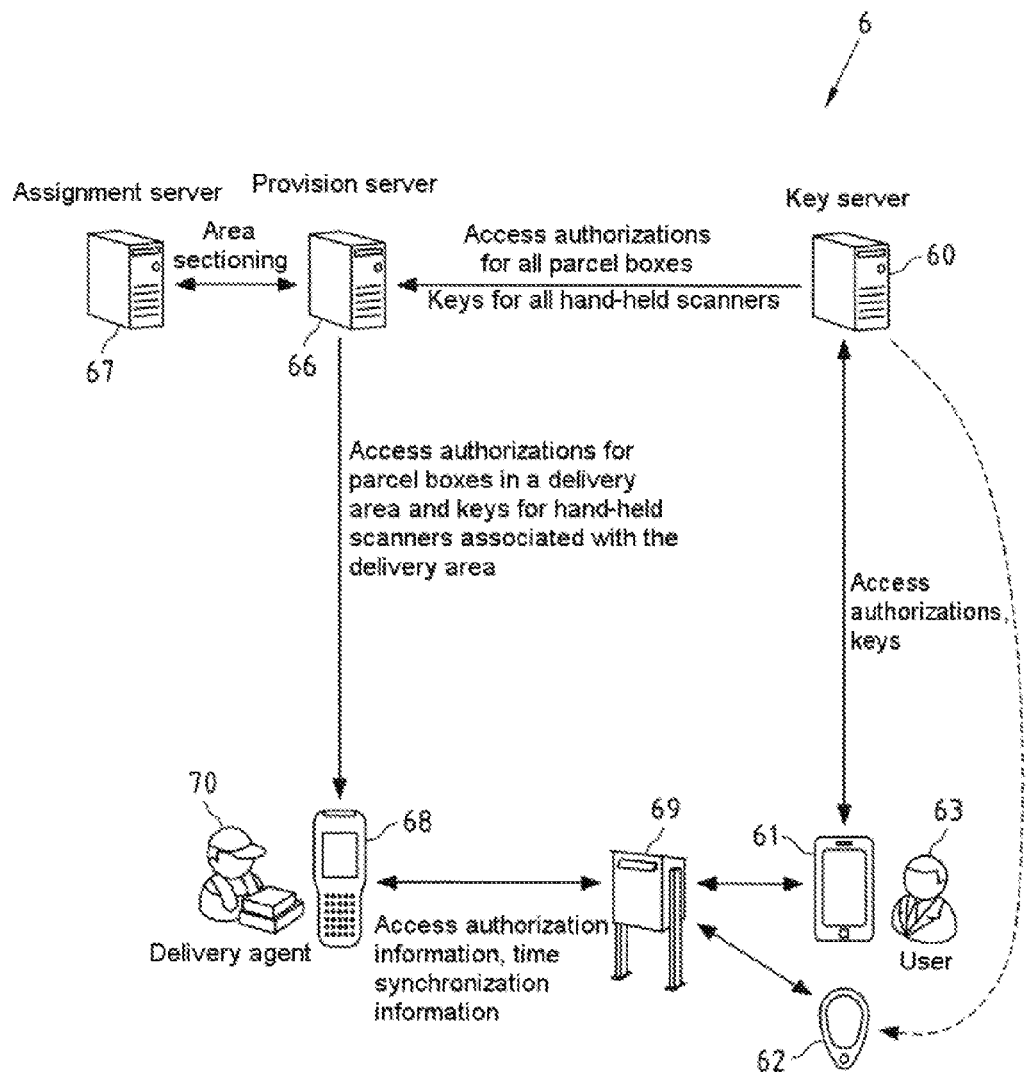
FIG. 4 shows a schematic illustration of a further exemplary embodiment of a system according to the present invention.

The substantiation of the components 1, 2 and 3 that is performed in FIG. 4 and the associated description serves merely for explanatory purposes, however, and is not intended to be understood as essential or restrictive. In particular, the interaction of the components 1, 2 and 3 substantiated in this manner, even in a general form—that is to say in a manner detached from the specific embodiment of these components—is intended to be understood as disclosed. This likewise applies to the transmission techniques substantiated for explanatory purposes, particularly Bluetooth and NFC, which are intended to be understood merely as an example of a possible form of wireless communication between second apparatuses 2 and first apparatuses 1.

A parcel box 69 is a container having at least one lockable door that is configured at least to hold parcels, for example at least one parcel having the dimensions 45×35×20 cm (corresponding to what is known as an "L Packset"), or at least two or three such parcels. The parcel box 69 may also have a mail compartment (but alternatively may also have no mail compartment) into which letters can be posted through a mail slot with or without a covering flap, for example. The mail compartment may be lockable with a dedicated door (having a mechanical or electronic lock), or can alternatively be locked by way of a door of the parcel box 69 together with a parcel compartment provided for holding the parcels. If one door is provided for the parcel compartment and one door is provided for the mail compartment, it is possible for the first apparatus 1 provided to be a shared access control apparatus, for example, which opens either one door (e.g. the door of the parcel compartment, e.g. for the delivery agent 70) or opens both doors (e.g. for the user 63), depending on the access authorization. The parcel box 69 may be provided for mounting in or on a wall, for example a house wall, or as a free standing unit for securing to the ground, e.g. in front of a house. The user 63 is notified about newly delivered shipments (parcels and/or letters) by email and/or SMS, for example. It is also possible for the user 63 to place franked shipments into the parcel box 69 and to request pickup online or by telephone. If pickup is not authorized, the shipment is sometimes picked up after some delay when a delivery agent next opens the parcel box and finds the shipment therein. As evidence of a shipment having been picked up, the delivery agent leaves behind a receipt in the parcel box, for example.

By way of example, the key server 60 is operated in a suitable computer center of a delivery company, particularly Deutsche Post DHL. Said key server generates the requisite keys, for example the symmetric or asymmetric key pair $S_1$, $S_2$, of which the first key $S_1$ remains in the key server 60 and the second key $S_2$ is stored in the lock, for example during production or startup thereof, and the symmetric or asymmetric key pair $H_3$, $H_4$. The key pairs $S_1,S_2$ can be chosen differently for each parcel box 69, but may also be the same for some or all parcel boxes 69. By way of example, the key pairs $H_3$, $H_4$ may be the same for each hand-held scanner 68, or different for some or all hand-held scanners 68 of the system 6. In addition, the key server generates the access authorizations B and the associated check information V. By way of example, the access authorizations may be different for different parcel boxes 69, for example because they contain different LockIDs. In that case, the associated pieces of check information V are accordingly also different. However, it is fundamentally possible for identical access authorizations B also to be used for one or more parcel boxes (for example if it/they does not/do not contain a LockID). The key server also generates the authentication information A by encrypting the fourth key $H_4$ with the first key $S_1$. Depending on whether the key pair $S_1$, $S_2$ is in each case chosen individually for the parcel boxes 69 and whether the key pair $H_3$, $H_4$ is in each case chosen individually for the hand-held scanners, these pieces of authentication information A may also be individual for the parcel boxes 69 and/or the hand-held scanners 68. By way of example, the key server 60 respectively transmits the access authorizations B, the check information V, the authentication information A and the third key $H_3$ for a plurality of hand-held scanners 68 to the provision server 66. By way of example, this can take place at regular intervals, e.g. every day afresh with new keys and/or new authorizations. By way of example, the provision server 66 then groups the respective pieces of information (B, V, A, $H_3$) that are required for a hand-held scanner 68 for a delivery area and obtained from a key server 60, and makes them directly or indirectly—for example by way of an interposed computer—available to the hand-held scanner 68. A delivery agent 70 for a delivery area thereby obtains all the information that is required in each case for the respective opening of the parcel boxes 69 on his round on his hand-held scanner 68. The respective pieces of information to be transmitted to the hand-held scanner 68 are assigned by taking account of the area sectioning, that is to say the assignment of delivery areas to delivery agents 70, that is performed by the assignment server 67. In parallel, the parcel recipients 63 also obtain their keys and access authorization informationen, that is to say e.g. B, V, A and $H_3$, which they can use to open the parcel boxes 69. For the users 63, in addition or as an alternative to the mobile telephones 61, tags 62 are provided, which normally open only the respective parcel boxes 69 associated with a user 62, however. The access authorization information and keys contained on the tags are likewise generated by the key server 60 and then stored on the tags, as indicated by the dashed lines in FIG. 4. These tags do not play a fundamental role for the synchronization and are therefore not described in more detail in the present case.

When the user 63 uses a mobile telephone to open the parcel box 69, this mobile telephone can use a software application (subsequently referred to as an "App"), for example, to communicate with the key server 60.

Some aspects of the access control system 6 in FIG. 4 are described in more detail below.

Access authorizations B are issued by the key server 60. By way of example, an access authorization can contain one or more of the following access authorization parameters:

LockID: ID of the lock
NotBeforeDate: "valid from" date with year/month/day
NotAfterDate: "valid to" date with year/month/day
StartTimeOfDay: time of day from when the access authorization is valid (standard e.g. 00:00:00)
EndTimeOfDay: time of day until when the access authorization is valid (standard e.g. 23:59:59)
MaxUses: number of uses; standard 0 means "unlimited"
Permissions: setting consent for security-critical operations In this case, the two parameters NotBeforeDate and NotAfterDate define the validity period of the access authorization, e.g. with the accuracy of one day. "NotBeforeDate" stipulates the date of first use and "NotAfterDate" stipulates the last day in the validity period. "StartTimeOfDay" additionally specifies the time of day from when the validity period begins, and "EndTimeOfDay" specifies when said validity period ends. By way of example, the accuracy is one second. "MaxUses" defines how often the key can be used in order to open a lock. In this case, the value "0" stipulates that the key can be used without limitation in the period, for example. "Permissions" codes, for example by setting individual bits in a byte, what security-critical operations a token is permitted to perform (a bit set to 1 then indicates the presence of authorization in each case), e.g. whether in each case opening of the parcel compartment, whether opening of the parcel compartment and mail compartment and/or whether performance of time synchronization is permitted (that is to say whether synchronization of the clock of the lock can be performed, as has already been explained for step 302 of the flowchart 300 in FIG. 3A/B).

By way of example, a lock is opened after a token (e.g. hand-held scanner 68) has authenticated itself by transmitting (e.g. by Bluetooth) a valid access authorization. As already mentioned, the access authorization can also be used to communicate temporal information T for synchronizing a clock of the lock and check information $V_T$ in this regard to the lock, but this can also take place in separate communications in the same communication session or else in separate communication sessions.

From the point of view of the lock (as an example of a first apparatus), the process of checking whether opening can take place is essentially as it has already been presented in steps 302-304 of the flowchart 300 in FIG. 3A/3B in respect of the check on the authorization for synchronization, but with the difference that step 302b does not—or not just—involve performing a check to determine whether synchronization is permissible (on the basis of an appropriately set bit in the "Permissions"), but rather that a check is performed to determine whether the access authorization parameters that the access authorization B contains in respect of respective reference information stored in the lock provide authorization for opening. In the simplest case, a check is performed, by way of example, only to determine whether a bit providing authorization to open one or more doors of the parcel box 69 is set in the "Permissions". Optionally, it is additionally possible for access authorization parameters such as LockID and/or MaxUses to be checked against a LockID stored in the lock or a counter for the opening operations that have taken place to date, and only if there is a respective match, for example, is it then possible to determine that there is authorization to open the parcel box 69. In particular, the temporal access authorization parameters NotBeforeDate and NotAfterDate (and optionally also the further parameters StartTimeOfDay and EndTimeOfDay) can also be compared with the clock of the lock in order to determine whether the access authorization information is actually still valid from the point of view of timing, that is to say, by way of example, the time indicated by the clock of the lock and the date define a time that lies from the time period defined by the temporal access authorization parameters.

In the case of this check to determine whether opening can take place, only step 302 (with modified substep 302*b* as described), for example, is then imperative, while steps 303 and 304 may each in turn be optional. The order of steps 302-304 and of the substeps that they each contain is also arbitrary.

If one or more of steps 303 and 304 are performed in addition to step 302 (with modified substep 302*b* as described), authorization to open the parcel box 69 is determined to be available only if all of these steps yield a positive result, for example.

Advantageously, in the same access authorization information B, for example, the setting of appropriate bits in the "Permissions" is used to grant the authorization both for synchronization and to open the parcel box 69, to check the availability of these authorizations in step 302*b* in each case and to communicate the access authorization information B together with the temporal information T. The reason is that if the pieces of information V, A and the response to the Challenge are then additionally obtained, the checks in steps 303 and 304 advantageously need to be performed only once in order to determine the integrity and authenticity of B in respect of the third apparatus (e.g. the key server 60) and the second apparatus (e.g. the hand-held scanner 68).

Thus, synchronization of the lock and opening thereof are then efficiently brought about in the same process, this being advantageous particularly even when the lock is battery operated and is transferred from an energy-saving sleep mode to an active mode only within the context of communication with access authorization verification apparatuses (e.g. hand-held scanner 68, mobile telephone 61 or tag 62). This transfer (and the lock remaining in the active mode for a certain time) is then necessary only once instead of twice, lowering the power requirement and increasing the life of the battery.

As already outlined, a clock (particularly a realtime clock) is implemented in the lock electronics of the parcel box 69. By way of example, this clock is integrated in the processor of the lock (cf. the clock 501 in the processor 50 in FIG. 2) and operates independently of the operating state of the processor (so long as a battery supply is present). This clock contains the present time of day and the date, and is used for checking the temporal validity of access authorizations, as a time stamp for log entries and/or for door monitoring, for example. By way of example, the clock has a dedicated clock generator that is designed for low or lowest power consumption. By way of example, the clock has a maximum deviation of ≤6 min/month. After the batteries are inserted into the lock, the clock starts, e.g. at a predefined start time, for example 00:00:00 hours, date 01.01.2014, or at the time of the last synchronization, if one has already taken place (otherwise, it is possible e.g. to use a predefined start time again), or at another stored time, for example a time stored regularly or on the basis of predefined events. If the clock is not synchronized, the time runs from this start time.

From time to time, the timing of the clock of the lock needs to be synchronized so that inaccuracies in the clock installed in the lock do not become too great. If this is not effected, valid access authorizations might be erroneously rejected by the lock.

The locks are normally operated in offline mode, so that it is not possible for the time to be monitored or reset on the server. However, time synchronization can involve the use of e.g. hand-held scanner 68 (and/or mobile telephone 61). This requires the device 68/61 to be regarded as a trustworthy source for the correct time by the lock, that is to say preferably to be authenticated.

The current time is transmitted to the lock by way of a Bluetooth connection, for example. To perform time synchronization, a hand-held scanner 68 (or mobile telephone 61) requires an access authorization B in which the correct authorization bit is set in the "Permissions" (as has already been described above). The same access authorization can also be used to open one or more doors of the parcel box. In other words, the synchronization information can be communicated more or less "in piggyback fashion" with access authorizations that are used to provide access.

The hand-held scanner 68 (or the mobile telephone 61) transmits (for example via Bluetooth) its running time and date as temporal information T and a validation feature $V_T$ for the generation of (e.g. a digital signature or an MAC) for example by means of cryptographic operations by way of at least T using the third key $H_3$ of the hand-held scanner 68 or mobile telephone 61. By way of example, T and $V_T$ are then transmitted to the lock together with (or separately from) B and V, e.g. in the same communication session. On the basis of the contents of B, a decision is then made in the lock to determine whether there is authorization available for time synchronization, and the values required therefor are taken from T after a check on $V_T$ (using $H_4$). This approach has already been explained using the example of FIG. 3A/B.

After the lock has checked the relevant access authorization B to the synchronization authorization and has received the data T and $V_T$ indicated above, the following steps are performed, for example:

1. If the transmitted time T lies in a defined time window (e.g. no more than 10-30 minutes before or after the current lock time), the lock adopts the transmitted time.
2. If the lock determines that it is in a state after initial startup, or after a reset, or after a battery change or other power failure and/or that time synchronization is taking place for the first time, the time T is adopted if it is greater (later) than the current lock time (possibly minus a threshold value). As mentioned above, the current lock time is a time advanced from a stipulated standard time, the time of the last synchronization or another stored time, for example. By way of example, a reset takes place when a, in particular deliberate, power interruption to the processor takes place (for example as a result of operation of a reset button on the lock or as a result of a received command from the token). By way of example, the lock can tell from the fact that it is in a state after a reset, battery change or other power failure or on initial startup that a flag is set to 0 (which, by way of example, is set to 1 only after time synchronization and automatically returns to 0 again on each of the events reset, battery change or other power failure, for example because it is stored in a memory that requires power) or that a counter for time synchronizations that have taken place, which counter is set to 0 on a reset/battery change/other power failure and to 0 on delivery, is still at 0.

3. After a time synchronization, according to 1. or 2., has taken place, an "UNLOCK" protocol is executed, that is to say that the access authorization B is validated (if this has not already happened) and checked and if need be the lock is opened.

This solution allows the time synchronization to be performed with a hand-held scanner 68 or a mobile telephone 61 if the synchronization time lies within a definable range relative to the lock time or the lock is in a predefined state. By way of example, the clock of the hand-held scanner 68 or of the mobile telephone 61 may be in the form of a radio clock in each case and therefore synchronized to a time signal transmitter to which the key server 60 also synchronizes itself. Alternatively, the key server can be synchronized on the basis of a network synchronization service, and the time for this can then also be used as a basis for the synchronization of hand-held scanner 68 and mobile telephone 61, for example by virtue of a docking station of the hand-held scanner 68 being connected to a computer that synchronizes the hand-held scanner 68 to the time of the network synchronization service whenever it is charged/refueled (by way of example, this is the computer already mentioned that obtains the access authorizations and keys for the parcel boxes in the delivery area of the hand-held scanner 68 from the provisional server 66 and then transmits them to the hand-held scanner 68 via the docking station or alternatively via WLAN). By way of example, a mobile telephone 61 can be synchronized via a mobile radio provider on the basis of the time of the network synchronization service, or via a data connection to a server that uses the network synchronization service, for example via an App of the mobile telephone 61, which App is also used to set up the connection to the key server.

In respect of the system 6 in FIG. 4, it should be noted that the type of access authorization information and check information used therein (that is to say particularly the pieces of information B, V, A, $H_3$) is merely exemplary and the synchronization performed between hand-held scanner 68 (or mobile telephone 61) and lock/parcel box 69 can also be used in the same way when a different kind of access authorization information that is dependent on temporal information is used. By way of example, the key server 60 may comprise, for each lock, a secret individual identifier or secret individual code (e.g. a symmetric key, for example an AES key) that is accordingly also stored in the lock in each case. By way of example, the time-limited access information for a particular lock can then be generated by linking temporal information, for example obtained from a clock, to the lock-specific code according to a stipulated (for example cryptographic) specification in order to obtain a piece of access authorization information. By way of example, the respective the current time of day (e.g. in minutes or hours, possibly with a date) is used from the clock and encrypted (for example symmetrically) with the lock-specific code. In the lock, the access authorization information obtained is decrypted using the code of the lock and compared with the time of day from the lock (accordingly in minutes or hours, possibly with a date). If the time of day obtained from the decrypted access authorization information lies within an interval determined according to a predefined rule (for example 10 minutes, or 1 hour, or 1 day around the current time of the lock or in the same hour or on the same day), then access authorization is assumed. In this case too, time synchronization for the clocks in the key server and the lock is indispensable.

Figure 5:
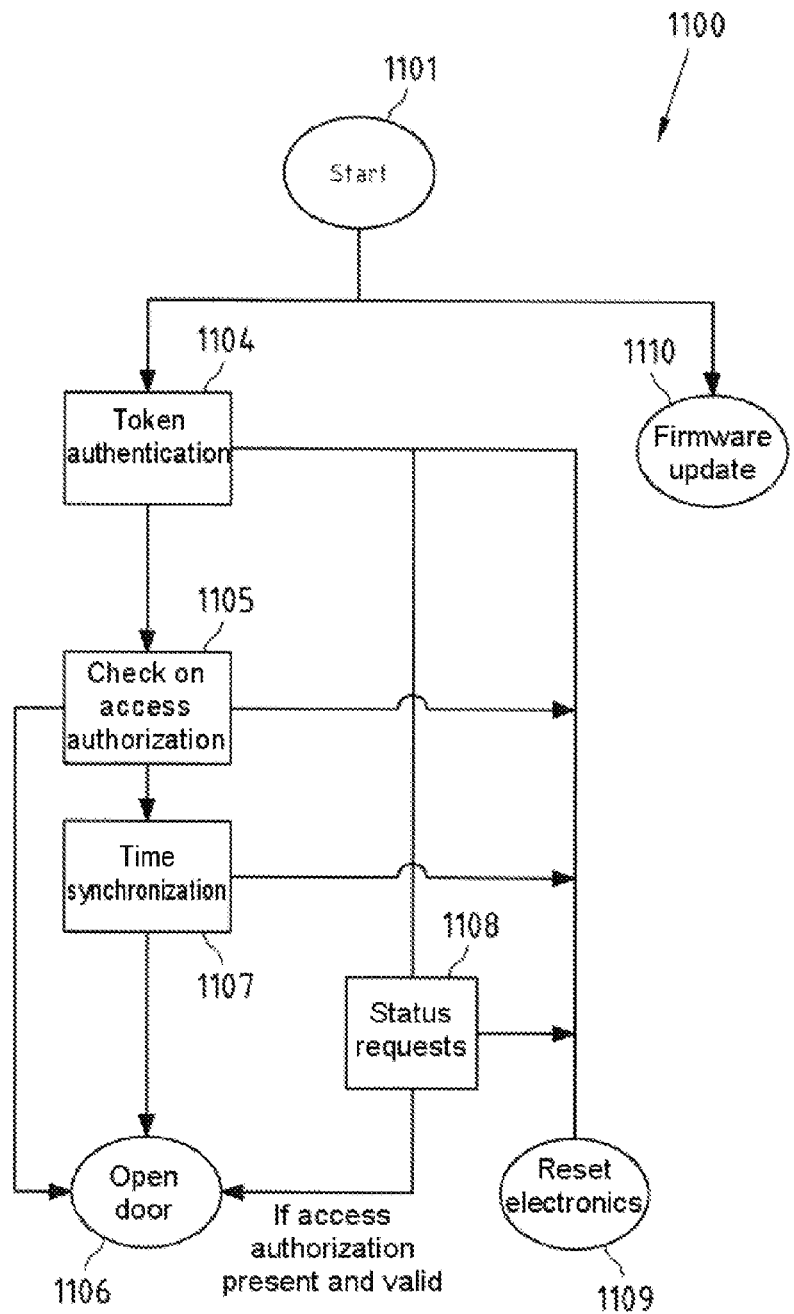
FIG. 5 shows a flowchart for the possible order of operations in an exemplary embodiment of a parcel box according to the present invention.

FIG. 5 shows an exemplary flowchart 1100 that presents the possible order of operations in a lock according to the invention. Which operations are generally intended to be performed by the lock can be communicated to the lock by the token, for example using one or more commands. Depending on the desired operation, one or more of the values B, V, A, T, $V_T$ described above and presented in FIG. 1 are then transmitted from the token (e.g. the hand-held scanner 68) to the lock.

After the start 1101, token authentication (using the key $H_4$, cf. step 304 in FIG. 3A/B) can be performed (step 1104) or a firmware update for the lock software (step 1110) can be performed. FIG. 5 is intended to be understood to mean that each operation is fundamentally optional, that is to say, by way of example, only step 1104 and step 1105 can be performed if desired. In addition, the execution can therefore also be terminated after each operation, for example after step 1108.

After successful token authentication 1104, it is possible either for the electronics to be reset (reset in step 1109), for the status of the lock to be requested (step 1108) or for a check on an obtained access authorization B to be performed (step 1105). After both steps, it is optionally also possible for a reset to be performed (step 1109). If the access authorization B provides authorization to open one or more doors of the parcel box 69, for example, then this/these door(s) is/are opened (step 1106). If the access authorization B indicates that—for example additionally—there is authorization for time synchronization, then synchronization of the clock of the lock is accordingly performed (step 1107). Thereafter, it is optionally possible—if there is authorization—for the door to be opened (step 1106) or a reset to be performed (step 1109). Also after a request for the status (step 1108), it is optionally possible—if there is authorization—for the door to be opened (step 1106).

As can be seen from FIG. 5, the door is not opened after the reset (step 1109) or the firmware update (step 1110).

The following are additionally intended to be disclosed as exemplary embodiments of the present invention:

Exemplary Embodiments 1-27; The embodiments defined in claims 1-27 of the PCT Application No. PCT/EP2014/076568, to which priority has been claimed above and which has been incorporated by reference in its entirety herein.

Exemplary Embodiment 28:

A method, performed by a second apparatus (2), the method comprising:

communication of temporal information (T), which is obtained using a clock of the second apparatus, to a first apparatus (1), in order to enable the first apparatus to perform one or more of the following checks:

a check (308) to determine whether the first apparatus (1) is in a state after initial startup, after a battery change or other power failure or after a reset, a check (307) to determine whether a deviation between temporal information ($T_{local}$) from a clock (501) of the first apparatus (1) and the communicated temporal information (T) is less than or less-than-or-equal-to a threshold value (D) that is predefined or determined according to a predefined rule, a check to determine whether the communicated temporal information (T) has the same date as the temporal information ($T_{local}$) from the clock (501) of the first apparatus (1), wherein the first apparatus (1) synchronizes its clock (501) using the communicated temporal information (T) if all of one or more predefined conditions are satisfied, one of the one or more conditions requires that at least one of the one or more performed check(s) has yielded a positive result.

Exemplary Embodiment 29

The method according to exemplary embodiment 28, wherein a further one of the one or more condition(s) requires the second apparatus (2) to have successfully authenticated itself to the first apparatus (1).

Exemplary Embodiment 30:

The method according to exemplary embodiment 29, wherein the authentication of the second apparatus to the first apparatus is based on a third key ($H_3$) that forms a symmetric or asymmetric key pair ($H_3$, $H_4$) with a fourth key ($H_4$) that is present in the first apparatus (1) at least at the time of a check on the authenticity of the second apparatus (2).

Exemplary Embodiment 31:

The method according to exemplary embodiment 30, wherein a plurality of second apparatuses (2) can communicate temporal information (T) to the first apparatus (1), and wherein at least one group of at least two second apparatuses from the plurality of second apparatuses that comprises the second apparatus (2) authenticate themselves to the first apparatus (1) using the same third key ($H_3$).

Exemplary Embodiment 32:

The method according to either of exemplary embodiments 30-31, wherein the authentication of the second apparatus (2) comprises performance of cryptographic operations (KRYPT) on the temporal information (T) using the third key ($H_3$) to obtain check information ($V_T$) and communication of the check information ($V_T$) to the first apparatus (1), which can check, based on the obtained check information ($V_T$), the obtained temporal information (T) and the fourth key ($H_4$), the authenticity of the second apparatus (2).

Exemplary Embodiment 33:

The method according to one of exemplary embodiments 30-32, further comprising:

communication of information (A) that comprises at least the fourth key, encrypted using at least a first key, to the first apparatus (1), so that the first apparatus (1) can decrypt the encrypted fourth key using at least a second key ($S_2$) to obtain the fourth key ($H_4$).

Exemplary Embodiment 34:

The method according to exemplary embodiment 33, wherein the first key ($S_1$) is not known to the second apparatus (2).

Exemplary Embodiment 35:

The method according to either of exemplary embodiments 33-34, wherein the first key ($S_1$) is stored on a third apparatus (3), wherein the third apparatus (3) generates the information (A) that comprises at least the fourth key ($H_4$) encrypted using the first key ($S_1$), and communicates this information (A) and the third key ($H_3$) to the second apparatus (2).

Exemplary Embodiment 36:

The method according to exemplary embodiment 35, further comprising:

communication of access authorization information (B) that comprises at least one access authorization parameter that defines a period within which the access authorization information (B) authorizes access to the first apparatus (1) or to an apparatus (69) controlled by the latter, and check information (V) that is generated by the third apparatus (3) by performing cryptographic operations (KRYPT) on the access authorization information (B) using the first key ($S_1$), to the first apparatus (1) in order to enable the first apparatus (1) to decide whether access can be granted, wherein necessary conditions for the granting of access are that, on the basis of an evaluation of the communicated check information (V) in the first apparatus (1) using the second key (S') and the communicated access authorization information (B), it is determined that the communicated check information (V) has been generated by performing cryptographic operations (KRYPT) on the information corresponding to the communicated access authorization information (B) using the first key ($S_1$), and that a check yields that the temporal information ($T_{local}$) from the clock (501) lies in the period defined by the at least one access authorization parameter.

Exemplary Embodiment 37:

The method according to one of exemplary embodiments 28-35, further comprising:

communication of access authorization information (B) that comprises at least one access authorization parameter that defines a period within which the access authorization information authorizes access to the first apparatus (1) or to an apparatus (69) controlled by the latter, to the first apparatus (1) in order to enable the first apparatus (1) to decide whether access can be granted, wherein a necessary condition for the granting of access is that a check yields that the temporal information ($T_{local}$) from the clock (501) lies in the period defined by the at least one access authorization parameter.

Exemplary Embodiment 38:

The method according to either of exemplary embodiments 36-37, wherein the communicated access authorization information (B) additionally comprises an access authorization parameter that indicates whether or not synchronization of the clock (501) of the first apparatus (1) can be performed, and wherein a further one of the one or more condition(s) requires that the access authorization parameter indicates that synchronization of the clock (501) of the first apparatus (1) can be performed.

Exemplary Embodiment 39:

The method according to one of exemplary embodiments 36-38, wherein the synchronization of the clock (501) takes place before the check to determine whether the temporal information ($T_{local}$) from the clock (501) lies in the period defined by the at least one access authorization parameter.

Exemplary Embodiment 40:

The method according to one of exemplary embodiments 36-39, wherein the temporal information (T) and the access authorization information (B) are communicated to the first apparatus (1) within the same communication session.

Exemplary Embodiment 41:

The method according to one of exemplary embodiments 36-40, wherein the period corresponds to a day.

Exemplary Embodiment 42:

The method according to one of exemplary embodiments 28-41, further comprising:

communication of access authorization information (B) that comprises at least one access authorization parameter that indicates whether or not synchronization of the clock (501) of the first apparatus (1) can be performed, to the first apparatus (1), wherein a further one of the one or more condition(s) requires that the access authorization parameter indicates that synchronization of the clock (501) of the first apparatus (1) can be performed.

Exemplary Embodiment 43:

The method according to one of exemplary embodiments 28-42, further comprising:

communication of access authorization information that comprises at least one access authorization parameter that defines a period, to the first apparatus, wherein a further one of the one or more condition(s) requires the communicated temporal information to lie within the period, Exemplary Embodiment 44:

The method according to one of exemplary embodiments 28-43, wherein a further one of the one or more condition(s) requires a date of the communicated temporal information to be later than a date of the time of the last synchronization or setting of the clock.

Exemplary Embodiment 45:

The method according to one of exemplary embodiments 28-44, wherein if the check yields that the deviation between the temporal information from the clock and the communicated temporal information is not either less than or less-than-or-equal-to the threshold value, then the following is performed:

setting of the clock to a time that results from the temporal information from the clock minus the threshold value if the communicated information is less than the temporal information from the clock minus the threshold value; and setting of the clock to a time that results from the temporal information from the clock plus the threshold value if the communicated information is not less than the temporal information from the clock minus the threshold value.

Exemplary Embodiment 46:

The method according to one of exemplary embodiments 28-45, wherein the clock (501) of the first apparatus (1) is automatically set to a predefined time, the time of the last synchronization or another time stored in the first apparatus (1) upon initial startup, after a battery change or other power failure or after a reset, and begins to run from said time.

Exemplary Embodiment 47:

The method according to one of exemplary embodiments 28-46, wherein the check to determine whether the first apparatus (1) is in a state after initial startup, after a battery change or other power failure or after a reset additionally involves checking (309) whether the communicated temporal information (T) is later than temporal information ($T_{local}$) from a clock (501) of the first apparatus (1) or than the temporal information (T) from the clock of the first apparatus (1) minus a threshold value (D) that is predefined or determined according to a predefined rule, and wherein a positive result of this check is obtained only if it is determined that the apparatus (1) is in a state after initial startup, after a battery change or other power failure or after a reset and the communicated temporal information (T) is later than the temporal information ($T_{local}$) from the clock (501) of the first apparatus (1) or than the temporal information (T) from the clock (501) of the first apparatus (1) minus the threshold value.

Exemplary Embodiment 48:

The method according to one of exemplary embodiments 28-47, wherein the predefined rule takes account of at least the average target time deviation in the clock (501) in relation to a time period and of the time that has elapsed since the last synchronization of the clock (501) was performed.

Exemplary Embodiment 49:

The method according to one of exemplary embodiments 28-48, wherein the temporal information (T) is obtained from a clock of the second apparatus (2) and wirelessly communicated to the first apparatus (1).

Exemplary Embodiment 50:

The method according to one of exemplary embodiments 28-49, wherein the first apparatus (1) controls access to a container, particularly a parcel box (69).

Exemplary Embodiment 51:

The method according to one of exemplary embodiments 28-50, wherein the second apparatus (2) is an electronic portable device of a delivery agent for shipments, particularly a hand-held scanner (68).

Exemplary Embodiment 52:

The method according to one of exemplary embodiments 28-51, wherein the temporal information (T) is communicated to the first apparatus (1) by means of wireless communication, particularly via Bluetooth or NFC.

Exemplary Embodiment 53:

A second apparatus (2), configured to perform and/or control the method according to one of exemplary embodiments 28-52 or comprising respective means for performing and/or controlling the steps of the method according to one of exemplary embodiments 28-52.

Exemplary Embodiment 54:

A computer program, comprising program instructions that cause a processor (50) to perform and/or control the method according to one of exemplary embodiments 1 to 25 or 28-52 when the computer program runs on the processor (50).

Exemplary Embodiment 55:

A system (4) comprising:

a first apparatus (1) according to exemplary embodiment 26, a second apparatus (2) according to exemplary embodiment 53.

The exemplary embodiments of the present invention that are described in this specification are intended to be understood as disclosed first of all singularly in each case but also in all combinations with one another. In particular, the description of a feature that an embodiment comprises is—unless explicitly explained to the contrary—also not intended to be understood, in the present case, to mean that the feature is indispensible or essential for the function of the exemplary embodiment. The sequence of the method steps outlined in this specification in the individual flowcharts is not imperative, and alternative sequences of the method steps are conceivable. The method steps can be implemented in different ways, an implementation in software (by virtue of programming instructions), hardware or a combination of the two is thus conceivable for implementing the method steps. Terms used in the patent claims such as "comprise", "have", "contain", "include" and the like do not exclude further elements or steps. The wording "at least in part" covers both the "in part" case and the "completely" case. The wording "and/or" is intended to be understood to mean that both the alternative and the combination are intended to be disclosed, that is to say that "A and/or B" means "(A) or (B) or (A and B)". Within the context of this specification, a plurality of units, persons or the like means multiple units, persons or the like. The use of the indefinite article does not exclude a plurality. A single device can perform the functions of multiple units or devices cited in the patent claims.

The invention claimed is:

1. A first apparatus comprising at least one processor and at least one memory that contains program code, wherein the memory and the program code are configured to cause the first apparatus to at least one of perform and control at least:
   obtaining temporal information communicated to the first apparatus, and
   performing one or more of the following checks:
      a check to determine whether the first apparatus is in a state after initial startup, after a battery change or other power failure, or after a reset, based on information relating to a synchronization that has already taken place,
      a check to determine whether a deviation between temporal information from a clock of the first apparatus and the communicated temporal information is less than or less-than-or-equal to a threshold value that is predefined or determined according to a predefined rule,
      a check to determine whether the communicated temporal information has the same date as the temporal information from the clock of the first apparatus,
   synchronizing the clock of the first apparatus using the communicated temporal information if all of one or more predefined conditions are satisfied, wherein one of the one or more predefined conditions requires that at least one of the one or more performed check(s) has yielded a positive result, wherein the one or more performed check(s) at least comprise the check to determine whether the first apparatus is in a state after initial startup, after a battery change or other power failure, or after a reset.

2. The first apparatus as claimed in claim 1, wherein the memory and the program code are configured to cause the first apparatus further to at least one of perform and control:
   obtaining access authorization information communicated to the first apparatus and comprising at least one access authorization parameter that defines a period within which the access authorization information authorizes access to the first apparatus or to an apparatus controlled by the latter, and
   deciding whether access can be granted, wherein a necessary condition for the granting of access is that a check yields that the temporal information from the clock of the first apparatus lies in the period defined by the at least one access authorization parameter.

3. The first apparatus as claimed in claim 2, wherein the communicated access authorization information further comprises an access authorization parameter that indicates whether or not synchronization of the clock of the first apparatus can be performed, and wherein a further one of the one or more predefined condition(s) requires that the access authorization parameter indicates that synchronization of the clock of the first apparatus can be performed.

4. The first apparatus as claimed in claim 2, wherein the synchronization of the clock of the first apparatus takes place before the check that determines whether the temporal information from the clock of the first apparatus lies in the period defined by the at least one access authorization parameter.

5. The first apparatus as claimed in claim 2, wherein the temporal information and the access authorization information are communicated to the first apparatus within the same communication session.

6. The first apparatus as claimed in claim 1, wherein the memory and the program code are configured to cause the first apparatus further to at least one of perform and control:
   obtaining access authorization information communicated to the first apparatus and comprising at least one access authorization parameter that indicates whether or not synchronization of the clock of the first apparatus can be performed, and wherein a further one of the one or more predefined condition(s) requires that the access authorization parameter indicates that synchronization of the clock of the first apparatus can be performed.

7. The first apparatus as claimed in claim 1, wherein the memory and the program code are configured to cause the first apparatus further to at least one of perform and control:
   obtaining access authorization information communicated to the first apparatus and comprising at least one access authorization parameter that defines a period, wherein a further one of the one or more predefined condition(s) requires that the communicated temporal information lies within the period.

8. The first apparatus as claimed in claim 1, wherein a further one of the one or more predefined condition(s) requires a date of the communicated temporal information to be later than a date of a time of the latest synchronization that has already taken place or of a most recent setting of the clock of the first apparatus.

9. The first apparatus as claimed in claim 1, wherein the clock of the first apparatus is automatically set to a predefined time, a time of the latest synchronization that has already taken place or another time stored in the first apparatus upon initial startup, after a battery change or other power failure, or after a reset, and begins to run from said time.

10. The first apparatus as claimed in claim 1, wherein the check that determines whether the first apparatus is in a state after initial startup, after a battery change or other power failure, or after a reset, further involves checking whether the communicated temporal information is later than temporal information from the clock of the first apparatus or than the temporal information from the clock of the first apparatus minus a threshold value that is predefined or determined according to a predefined rule, and wherein a positive result of this check is obtained only if it is determined that the apparatus is in the state after initial startup, after a battery change or other power failure, or after a reset, and the communicated temporal information is later than the temporal information from the clock of the first apparatus or than the temporal information from the clock of the first apparatus minus the threshold value.

11. The first apparatus as claimed in claim 1, wherein the temporal information is obtained from a clock of a second apparatus and wirelessly communicated to the first apparatus.

12. The first apparatus as claimed in claim 1, wherein the first apparatus controls access to a container.

13. The first apparatus as claimed in claim 1, wherein the temporal information is communicated to the first apparatus by means of wireless communication.

14. The first apparatus as claimed in claim 1, wherein it is decided by a check whether the information relating to a synchronization that has already taken place is stored in the first apparatus, whether the first apparatus is in the state after initial startup, after a battery change or other power failure, or after a reset.

15. The first apparatus as claimed in claim 1, wherein the information relating to a synchronization that has already taken place is not yet stored in the first apparatus on initial startup or is erased even it was present, after events such as a battery change or other power failure, or reset, in the first apparatus.

16. The first apparatus as claimed in claim 1, wherein the information relating to a synchronization that has already taken place is a set bit which indicates, that at least one synchronization has already taken place, or is a more detailed information, that counts the number of synchronizations that have already taken place and/or stores information pertaining to the respective synchronization.

17. A method, performed by a first apparatus, the method comprising:
    obtaining temporal information communicated to the first apparatus, and
    performing one or more of the following checks:
        a check to determine whether the first apparatus is in a state after initial startup, after a battery change or other power failure, or after a reset, based on information relating to a synchronization that has already taken place,
        a check to determine whether a deviation between temporal information from the clock of the first apparatus and the communicated temporal information is less than or less-than-or-equal to a threshold value that is predefined or determined according to a predefined rule,
        a check to determine whether the communicated temporal information has the same date as the temporal information from the clock of the first apparatus,
    synchronizing the clock of the first apparatus using the communicated temporal information if all of one or more predefined conditions are satisfied, wherein one of the one or more predefined conditions requires that at least one of the one or more performed check(s) has yielded a positive result, wherein the one or more performed check(s) at least comprise the check to determine whether the first apparatus is in a state after initial startup, after a battery change or other power failure, or after a reset.

18. The method as claimed in claim 17, wherein at least one of the following holds:
    it is decided by a check whether the information relating to the synchronization that has already taken place is stored in the first apparatus, whether the first apparatus is in the state after initial startup, after a battery change or other power failure, or after a reset,
    the information relating to the synchronization that has already taken place is a set bit which indicates, that at least one synchronization has already taken place, or is a more detailed information, that counts the number of synchronizations that have already taken place and/or stores information pertaining to the respective synchronization.

19. A first apparatus comprising at least one processor and at least one memory that contains program code, wherein the memory and the program code are configured to cause the first apparatus to at least one of perform and control at least:
    obtaining temporal information communicated to the first apparatus,
    performing one or more of the following checks:
        a check to determine whether the first apparatus is in a state after initial startup, after a battery change or other power failure, or after a reset,
        a check to determine whether a deviation between temporal information from a clock of the first apparatus and the communicated temporal information is less than or less-than-or-equal to a threshold value that is predefined or determined according to a predefined rule,
        a check to determine whether the communicated temporal information has the same date as the temporal information from the clock of the first apparatus,
    synchronizing the clock of the first apparatus using the communicated temporal information if all of one or more predefined conditions are satisfied, wherein one of the one or more predefined conditions requires that at least one of the one or more performed check(s) has yielded a positive result, wherein the one or more performed check(s) at least comprise the check to determine whether the first apparatus is in a state after initial startup, after a battery change or other power failure, or after a reset,
    obtaining access authorization information communicated to the first apparatus and comprising at least one access authorization parameter that defines a period within which the access authorization information authorizes access to the first apparatus or to an apparatus controlled by the latter, and
    deciding whether access can be granted, wherein a necessary condition for the granting of access is that a check yields that the temporal information from the clock of the first apparatus lies in the period defined by the at least one access authorization parameter, wherein the synchronization of the clock of the first apparatus takes place before the check that determines whether the temporal information from the clock of the first apparatus lies in the period defined by the at least one access authorization parameter.

20. A first apparatus comprising at least one processor and at least one memory that contains program code, wherein the memory and the program code are configured to cause the first apparatus to at least one of perform and control at least:
    obtaining temporal information communicated to the first apparatus,
    performing one or more of the following checks:
        a check to determine whether the first apparatus is in a state after initial startup, after a battery change or other power failure, or after a reset,
        a check to determine whether a deviation between temporal information from a clock of the first apparatus and the communicated temporal information is less than or less-than-or-equal to a threshold value that is predefined or determined according to a predefined rule,
        a check to determine whether the communicated temporal information has the same date as the temporal information from the clock of the first apparatus,
    synchronizing the clock of the first apparatus using the communicated temporal information if all of one or more predefined conditions are satisfied, wherein one of the one or more predefined conditions requires that at least one of the one or more performed check(s) has yielded a positive result, wherein the one or more performed check(s) at least comprise the check to determine whether the first apparatus is in a state after initial startup, after a battery change or other power failure, or after a reset, and
    obtaining access authorization information communicated to the first apparatus and comprising at least one access authorization parameter that indicates whether or not synchronization of the clock of the first apparatus can be performed, and wherein a further one of the one or more predefined condition(s) requires that the access authorization parameter indicates that synchronization of the clock of the first apparatus can be performed.

21. A first apparatus comprising at least one processor and at least one memory that contains program code, wherein the memory and the program code are configured to cause the first apparatus to at least one of perform and control at least:
    obtaining temporal information communicated to the first apparatus,
    performing one or more of the following checks:
        a check to determine whether the first apparatus is in a state after initial startup, after a battery change or other power failure, or after a reset,
        a check to determine whether a deviation between temporal information from a clock of the first apparatus and the communicated temporal information is less than or less-than-or-equal to a threshold value that is predefined or determined according to a predefined rule,
        a check to determine whether the communicated temporal information has the same date as the temporal information from the clock of the first apparatus,
    synchronizing the clock of the first apparatus using the communicated temporal information if all of one or more predefined conditions are satisfied, wherein one of the one or more predefined conditions requires that at least one of the one or more performed check(s) has yielded a positive result, wherein the one or more performed check(s) at least comprise the check to determine whether the first apparatus is in a state after initial startup, after a battery change or other power failure, or after a reset, and
    obtaining access authorization information communicated to the first apparatus and comprising at least one access authorization parameter that defines a period, wherein a further one of the one or more predefined condition(s) requires that the communicated temporal information lies within the period.

22. A first apparatus comprising at least one processor and at least one memory that contains program code, wherein the memory and the program code are configured to cause the first apparatus to at least one of perform and control at least:
    obtaining temporal information communicated to the first apparatus, and
    performing one or more of the following checks:
        a check to determine whether the first apparatus is in a state after initial startup, after a battery change or other power failure, or after a reset,
        a check to determine whether a deviation between temporal information from a clock of the first apparatus and the communicated temporal information is less than or less-than-or-equal to a threshold value that is predefined or determined according to a predefined rule,
        a check to determine whether the communicated temporal information has the same date as the temporal information from the clock of the first apparatus,
    synchronizing the clock of the first apparatus using the communicated temporal information if all of one or more predefined conditions are satisfied, wherein one of the one or more predefined conditions requires that at least one of the one or more performed check(s) has yielded a positive result, wherein the one or more performed check(s) at least comprise the check to determine whether the first apparatus is in a state after initial startup, after a battery change or other power failure, or after a reset, wherein the check that determines whether the first apparatus is in a state after initial startup, after a battery change or other power failure, or after a reset, further involves checking whether the communicated temporal information is later than temporal information from the clock of the first apparatus or than the temporal information from the clock of the first apparatus minus a threshold value that is predefined or determined according to a predefined rule, and wherein a positive result of this check is obtained only if it is determined that the apparatus is in the state after initial startup, after a battery change or other power failure, or after a reset, and the communicated temporal information is later than the temporal information from the clock of the first apparatus or than the temporal information from the clock of the first apparatus minus the threshold value.

* * * * *